(12) United States Patent
Gombolay et al.

(10) Patent No.: US 12,468,279 B2
(45) Date of Patent: Nov. 11, 2025

(54) HUMAN-ROBOT COLLABORATIVE FLEXIBLE MANUFACTURING SYSTEM AND METHOD

(71) Applicant: Georgia Tech Research Corporation, Atlanta, GA (US)

(72) Inventors: Matthew C. Gombolay, Atlanta, GA (US); Michael J. Johnson, Atlanta, GA (US); Ruisen Liu, Atlanta, GA (US); Nakul Gopalan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 527 days.

(21) Appl. No.: 17/933,323

(22) Filed: Sep. 19, 2022

(65) Prior Publication Data
US 2023/0086122 A1 Mar. 23, 2023

Related U.S. Application Data

(60) Provisional application No. 63/245,408, filed on Sep. 17, 2021.

(51) Int. Cl.
*G05B 19/401* (2006.01)
*B23P 21/00* (2006.01)

(52) U.S. Cl.
CPC ............ *G05B 19/401* (2013.01); *B23P 21/00* (2013.01); *G05B 2219/36412* (2013.01); *G05B 2219/39001* (2013.01); *G05B 2219/40126* (2013.01)

(58) Field of Classification Search
CPC ...... B23P 21/00; B25J 9/1664; G05B 19/401; G05B 19/423; G05B 2219/36412; G05B 2219/39001; G05B 2219/39271; G05B 2219/40126
See application file for complete search history.

(56) References Cited

U.S. PATENT DOCUMENTS

| 10,919,152 B1* | 2/2021 | Kalouche | B25J 9/1697 |
| 2015/0290801 A1* | 10/2015 | Kuwahara | G05B 19/425 700/250 |
| 2019/0184582 A1* | 6/2019 | Namiki | H04N 23/90 |
| 2020/0306988 A1* | 10/2020 | Shaffer | G05B 19/4184 |

(Continued)

OTHER PUBLICATIONS

Austin Weber, "Assembly Automation Takes Off in Aerospace Industry," Assembly Magazine, 2015. URL https://www.assemblymag.com/articles/92790-assembly-automation-takes-off-in-aerospace-industry.

(Continued)

*Primary Examiner* — Tameem D Siddiquee
(74) *Attorney, Agent, or Firm* — Meunier Carlin & Curfman LLC

(57) ABSTRACT

An exemplary method and system are disclosed to flexibly and adaptably manufacture and assemble a workpiece by using recordings of a user in machine learning/artificial intelligence algorithms to train a robot for subsequent automated manufacture. Machine learning and artificial intelligence learning can generate libraries of generalized dynamic motion primitives that can be subsequently combined for any type of manufacturing or assembling activity. The exemplary method and system can flexibly generate a model of an existing workpiece as a template or primer workpiece that can then be used in conjunction with the DMP operations to fabricate subsequent workpieces.

19 Claims, 13 Drawing Sheets

(56) References Cited

U.S. PATENT DOCUMENTS

| | | | | |
|---|---|---|---|---|
| 2021/0171135 A1* | 6/2021 | Blankespoor | .......... | G05D 1/245 |
| 2021/0239949 A1* | 8/2021 | Breese | .................. | G02B 13/06 |
| 2022/0335588 A1* | 10/2022 | He | ........................ | G06V 10/87 |

OTHER PUBLICATIONS

Zhu, Z., and Hu, H., "Robot learning from demonstration in robotic assembly: A survey," Robotics, vol. 7, No. 2, 2018. https://doi.org/10.3390/robotics7020017.

Tang, T., Lin, H. C., Zhao, Y., Fan, Y., Chen, W., and Tomizuka, M., "Teach industrial robots peg-hole-insertion by human demonstration," IEEE/ASME International Conference on Advanced Intelligent Mechatronics, AIM, vol. 2016-Septe, 2016, pp. 488-494. https://doi.org/10.1109/AIM.2016.7576815.

Ijspeert, A. J., Nakanishi, J., Hoffmann, H., Pastor, P., and Schaal, S., "Dynamical Movement Primitives : Learning Attractor Models for Motor Behaviors," Neural Computation, vol. 25, 2013, pp. 328-373. URL http://www.mitpressjournals.org/doi/abs/10.1162/NECO_a_00393.

Abu-Dakka, F. J., Nemec, B., Kramberger, A., Buch, A. G., Krüger, N., and Ude, A., "Solving peg-in-hole tasks by human demonstration an exception strategies," Industrial Robot, vol. 41, No. 6, 2014, pp. 575-584. https://doi.org/10.1108/IR-07-2014-0363.

Maeda, G., Ewerton, M., Lioutikov, R., Ben Amor, H., Peters, J., and Neumann, G., "Learning interaction for collaborative tasks with probabilistic movement primitives," IEEE-RAS International Conference on Humanoid Robots, vol. 2015-Febru, 2015, pp. 527-534. https://doi.org/10.1109/HUMANOIDS.2014.7041413.

Chhatpar, S. R., and Branicky, M. S., "Search strategies for peg-in-hole assemblies with position uncertainty," IEEE International Conference on Intelligent Robots and Systems, vol. 3, 2001, pp. 1465-1470. https://doi.org/10.1109/iros.2001.977187.

Xi, F. F., Yu, L., and Tu, X. W., "Framework on robotic percussive riveting for aircraft assembly automation," Advances in Manufacturing, vol. 1, No. 2, 2013, pp. 112-122. https://doi.org/10.1007/s40436-013-0014-5.

Zhu, W., Mei, B., Yan, G., and Ke, Y., "Measurement error analysis and accuracy enhancement of 2D vision system for robotic drilling," Robotics and Computer-Integrated Manufacturing, vol. 30, No. 2, 2014, pp. 160-171. https://doi.org/10.1016/j.rcim.2013.09.014, URL http://dx.doi.org/10.1016/j.rcim.2013.09.014.

Qiao, H., and Tso, S. K., "Three-step precise robotic peg-hole insertion operation with symmetric regular polyhedral objects," International Journal of Production Research, vol. 37, No. 15, 1999, pp. 3541-3563. https://doi.org/10.1080/002075499190176.

Broenink, J. F., and Tiernego, M. L. J., "Peg-in-Hole assembly using Impedance Control with a 6 DOF Robot," Proceedings 8th European Simulation Symposium, , No. Jan. 1996, pp. 504-508.

Qiao, H., Dalay, B. S., and Parkin, R. M., "Robotic Peg-Hole Insertion Operations using a Six-Component Force Sensor," Proceedings of the Institution of Mechanical Engineers, Part C: Journal of Mechanical Engineering Science, vol. 207, No. 5, 1993, pp. 289-306.

Chhatpar, S. R., and Branicky, M. S., "Localization for Robotic Assemblies with Position Uncertainty," IEEE International Conference on Intelligent Robots and Systems, vol. 3, 2003, pp. 2534-2540. https://doi.org/10.1109/iros.2003.1249251.

Toris, R., and Kent, D., "Rail Segmentation," , 2014. URL https://github.com/GT-RAIL/rail_segmentation/tree/kinetic-devel.

Lowe, D. G., "Distinctive image features from scale-invariant keypoints," International Journal of Computer Vision, 2004, pp. 91-110. URL https://www.cs.ubc.ca/~lowe/papers/ijcv04.pdf.

Bradski, G., "The OpenCV Library," Dr. Dobb's Journal of Software Tools, 2000.

Koch, G., Zemel, R., and Salakhutdinov, R., "Siamese Neural Networks for One-shot Image Recognition," International Conference on Machine Learning, 2015. https://doi.org/10.1136/bmj.2.5108.1355-c.

Chernova, S., and L. Thomaz, A., "Robot learning from human teachers," Synthesis Lectures on Artificial Intelligence and Machine Learning, vol. 28, 2014, pp. 1-121. https://doi.org/10.2200/S00568ED1V01Y201402AIM028.

Stulp, F., and Sigaud, O., "Path integral policy improvement with covariance matrix adaptation," Proceedings of the 29th International Conference on Machine Learning, ICML 2012, vol. 1, 2012, pp. 281-288.

* cited by examiner

HUMAN-ROBOT COLLABORATIVE FLEXIBLE MANUFACTURING SYSTEM AND METHOD

RELATED APPLICATION

This application claims priority to, and the benefit of, U.S. Provisional Patent Application No. 63/245,408, filed Sep. 17, 2021, which is incorporated by reference herein in its entirety.

BACKGROUND

Manufacturing industries are increasingly adopting automated machinery to accomplish labor-intensive tasks and to meet growing production demands. Traditionally, production floors are filled with fixed-installation robots that are not easily adapted to changing needs. While such structures have improved production volume and quality, these machines offer low versatility, take up a large amount of space, and cannot automate tasks that require maneuvering through an unfamiliar workspace.

Flexible manufacturing techniques, while an improvement to many automated machinery manufacturing systems, still provide their own challenges. Flexible manufacturing techniques generally require extensive programming before implementing the automated machinery operation. Some tasks may additionally be too challenging to implement quickly and efficiently on automated machinery, leaving manufacturers to opt for human labor.

There is a benefit to improving the flexibility and adaptability of automated manufacturing robots and machinery.

SUMMARY

An exemplary method and system are disclosed to flexibly and adaptably manufacture and assemble a workpiece by using recordings of a user in machine learning/artificial intelligence algorithms to train a robot for subsequent automated manufacture. Machine learning and artificial intelligence learning can generate libraries of generalized dynamic motion primitives that can be subsequently combined for any type of manufacturing or assembling activity. The exemplary method and system can flexibly generate a model of an existing workpiece as a template or primer workpiece that can then be used in conjunction with the Dynamic Movement Primitive (DMP) operations to fabricate subsequent workpieces.

The exemplary system and method facilitate faster and more straightforward programming of complex routines for multi-axis control robots using human movement and approach as initial waypoints or conditions to which further optimization by the AI algorithm, via reinforcement learning, can be performed.

In an aspect, a method is disclosed to manufacture or assemble a workpiece comprising landmark or holes by capturing, with a processor and while a camera mounted on a robot arm is swept through a workspace, a set of images of a first workplace (e.g., template workpiece), wherein the first workpiece comprises one or more holes; generating, by the processor, a composite image or a data model of the first workpiece (e.g., using the Scale-invariant feature transform (SIFT) algorithm or others) by aggregating at least a portion of the set of images of the first workpiece, wherein the composite image or the data model includes an image of, or data object representing, the first workpiece having a workpiece region captured at a surface normal orientation; and determining, by the processor, using the composite image or a portion thereof, coordinates of landmark locations (e.g., hole locations) of the one or more holes of the first workpiece and/or characteristics of the one or more holes; wherein the determined coordinates of landmark locations (e.g., hole locations) and/or characteristics of the one or more landmarks (e.g., holes) are used by a robotic system (or the robot arm) to perform manufacturing action on, or to, a second workpiece to make it resemble the first workpiece (e.g., drill holes, install attachments, or additionally spray, cut, assemble, wrap).

In some embodiments, the method further includes directing, by the processor, the robot arm, or a mechanized actuator of the camera, to orient the camera to an orientation to capture the image of the first workpiece at a surface normal orientation, wherein the surface normal orientation is determined by: determining, by the processor, a point cloud data object of the captured set of images; determining, by the processor, a plane intersecting a pre-defined portion of the point cloud data object; and determining, by the processor, a normal vector or direction from the plane as the surface normal orientation.

In some embodiments, determining the characteristics of the one or more landmarks (e.g., holes) includes: determining, via a classification operation (e.g., using an AI model or operation), a classification value for at least one of the one or more landmarks (e.g., holes).

In some embodiments, the classification operation is performed using a trained AI model or operation.

In some embodiments, the trained AI model or operation includes a trained neural network (e.g., a dual/Siamese neural network).

In some embodiments, the method includes generating the composite image or the data model of the first workpiece, including of a first image and a second image, includes: determining candidate features (e.g., SIFT descriptors, Gabor filters, etc.) in the first image and the second image, wherein the first image and the second image each has a workpiece region captured at a given surface normal orientation; aligning the candidate features of the first image and the second image (e.g., based on pixel matching); and generating, via a stitching operation, the composite image or the data model using the first image and the second image, or portions thereof.

In some embodiments, the method includes determining, by the processor, a first dynamic motion primitive data object; updating, by the processor, via an AI-learning operation, the first dynamic motion primitive data object using the coordinates of landmark locations of the one or more landmarks of the first workpiece as a target parameter in the reinforcement learning, wherein the first dynamic motion primitive data object, or instructions derived therefrom, is stored and subsequently used to direct a robotic system in the fabrication of the second workpiece.

In some embodiments, the reinforcement learning employs a reward function that minimizes, from multiple guided learning examples, (i) difference or residual of measured or determined force in a direction of action to a pre-defined value (static or dynamic), (ii) difference or residual of measured or determined position to a pre-defined trajectory of movement, (iii) difference or residual of the measured or determined position of a target of the action, or (iv) a combination thereof.

In some embodiments, the method includes determining, by the processor, a second dynamic motion primitive data object; updating, by the processor, via then AI-learning operation, the second dynamic motion primitive data object using the coordinates of landmark locations of the one or more landmarks of the first workpiece, wherein the second dynamic motion primitive data object or an instruction derived therefrom, is stored and subsequently used in combination with the first dynamic motion primitive to direct the robotic system in the fabrication of the second workpiece.

In some embodiments, a first dynamic motion primitive data object, or the instructions derived therefrom, includes at least one of: first kinetic instructions to move from a first position to a second position to insert an attachment at a landmark defined as a target location; second kinetic instructions to move an effector component from a third position to a fourth position to drill a landmark at a target location; third kinetic instructions to move the effector component from a first position to a second position to spray or dispense a propellant (coating or paint) over a set of target location of regions; fourth kinetic instructions to move the effector component from a first position to a second position to cut a set of target location of regions; and fifth kinetic instructions to move the effector component from a first position to a second position (linear or polar) to rotate a wrap over a set of target location of regions.

In some embodiments, a first dynamic motion primitive data object, or the instructions derived therefrom, includes, at least: a first movement primitive data object, the first movement primitive data object being associated with the movement of the robot arm from a first position to a second position, wherein the second position is associated with a task movement; and a second movement primitive data object associated with the task movement, the second movement primitive data object includes instructions to at least one of an insertion task, a drilling task, a holding task, a spraying task, or coating task, and a wrapping task.

In some embodiments, the method further includes defining, by the processor, a salient region of the workspace based on two or more coordinates received from measurements of the robotic arm established by the user.

In some embodiments, the method further includes defining, by the processor, a salient region of the workspace based on two or more coordinates received from the user.

In some embodiments, the salient region includes a first coordinate position and a second coordinate position, the first and second coordinate positions being interpolated to define a grid of waypoints parallel to a determined surface of the workpiece.

In some embodiments, the method further includes determining instructions to perform the manufacturing action on or to the second workpiece to make it resemble the first workpiece based on motive primitives generated from the determined coordinates of the landmark locations and/or the characteristics of the one or more landmarks.

In another aspect, a system is disclosed including a processor; a memory having instructions stored thereon, wherein execution of the instructions by the processor causes the processor to: (i) image data from a camera mounted on a robot arm and (ii) coordinate data of a landmark on the robot arm; while the camera mounted on the robot arm is swept through a workspace, capture a set of images of a first workpiece (e.g., template workpiece) and corresponding set of coordinate data of the landmark, wherein the first workpiece comprises one or more landmarks; generate a composite image or a data model of the first workpiece (e.g., using the SIFT algorithm or others) by aggregating at least a portion of the set of images of the first workpiece, wherein the composite image or the data model includes an image of, or data object representing, the first workpiece having a workpiece region captured at a surface normal orientation; and determine using the composite image or a portion thereof and the corresponding set of coordinate data, coordinates of landmark locations of the one or more landmarks of the first workpiece and/or characteristics of the one or more landmarks; wherein the determined coordinates of landmark locations and/or characteristics of the one or more landmarks are used by a robotic system (or the robot arm) to perform manufacturing action on, or to, a second workpiece to make it resemble the first workpiece (e.g., drill holes, install attachments, spray, cut, assemble, wrap).

In some embodiments, the system's instructions, when executed, cause the processor to perform any of the above-discussed methods.

In some embodiments, the system further includes the robot arm; the camera mounted to said robot arm; and a robot controller, the robot controller being operatively connected to the process and configured to receive the image data and the coordinate data.

In some embodiments, the robot controller is configured to receive instructions to perform a manufacturing task based on a set of movement primitives derived from the determined coordinates of landmark locations (e.g., hole locations) and/or the characteristics of the one or more landmarks.

In another aspect, a non-transitory computer-readable medium is disclosed, including instructions stored thereon, wherein execution of the instructions by the processor causes the processor to perform any of the above-discussed methods so far discussed.

BRIEF DESCRIPTION OF THE DRAWINGS

The accompanying drawings, which are incorporated in and constitute a part of this specification, illustrate embodiments and, together with the description, serve to explain the principles of the methods and systems.

DETAILED SPECIFICATION

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the $1^{st}$ reference in the list. All references cited and discussed in this specification are incorporated herein by reference in their entirety and to the same extent as if each reference was individually incorporated by reference.

Example System

Figure 1:
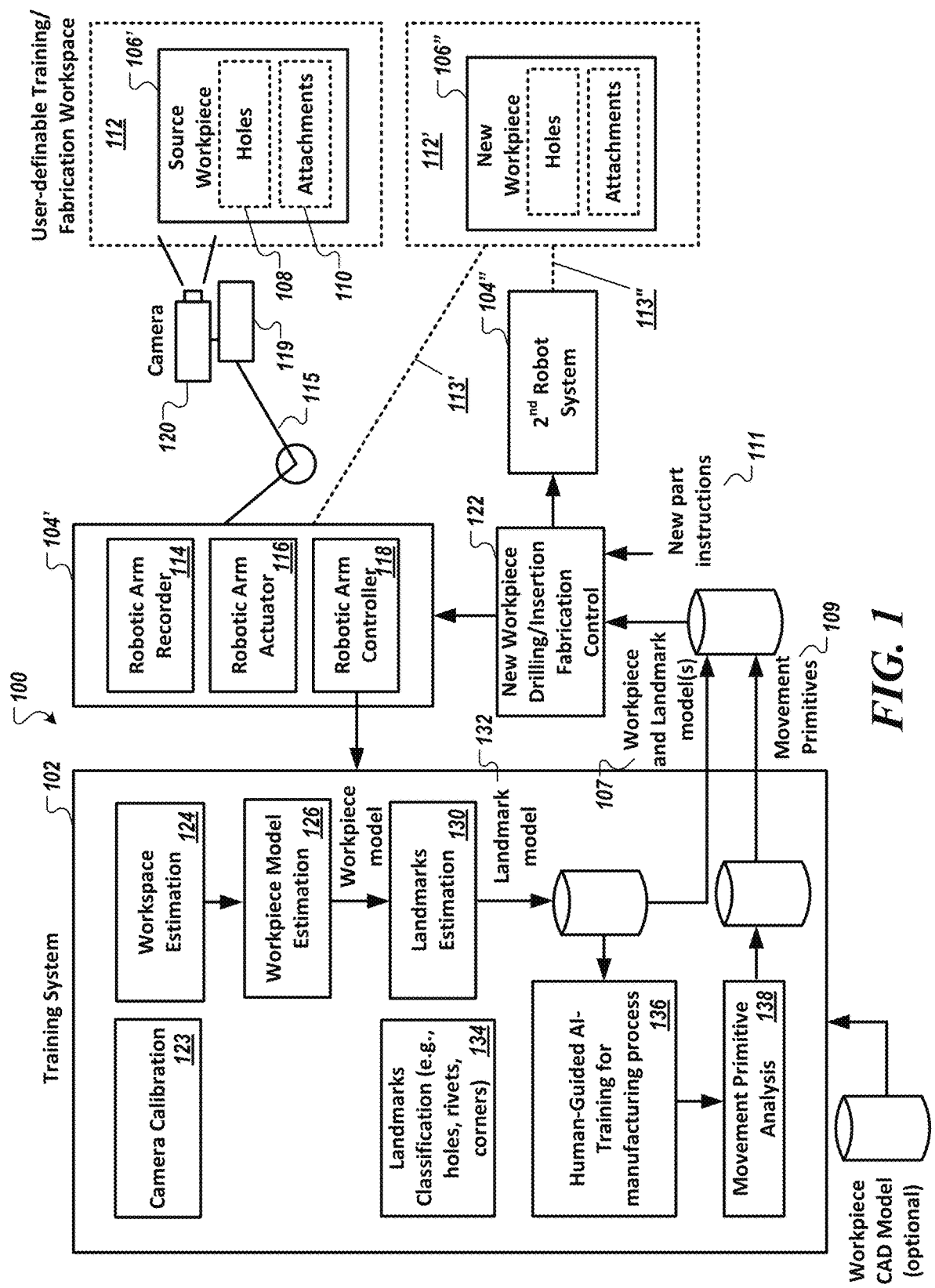
FIG. 1 shows an example human-robot collaborative flexible manufacturing system in accordance with an illustrative embodiment.

FIG. 1 shows an example human-robot collaborative flexible manufacturing system 100 in accordance with an illustrative embodiment. In the example of FIG. 1, the human-robot collaborative flexible manufacturing system 100 includes a user-guided or assisted training system (shown as "Training System" 102), a robotic system 104 (shown as 104'), and source workpiece 106 (shown as 106') that allows a human expert (also referred to as the user) to demonstrate and teach various steps of a manufacturing or assembly process to a robotic system.

The exemplary system 100 is configured to subsequently manufacture and/or assemble, via the robotic system 104' and another robotic system 104 (shown as 104"), a new workpiece 106 (shown as new workpiece 106") using a model 107 (shown as "workpiece and landmark model(s)") of the source workpiece 106'. That is, robot movement data/coordinates and images of the workpiece 106' acquired by the robotic system 104', while the robotic system 104' is guided by a user to perform an action and/or task with respect to workpiece 106' in a user-guided operation, are analyzed by the training system 102 to (i) define a workspace 112 for that action/task in relation to the workpiece 106' and (ii) generate the model 107 of the source workpiece 106' comprising geometric information of the workpiece as well as features of the workpiece such as holes or attachments. The model 107 of the source workpiece 106' can be used in combination with dynamic movement primitives 109 (existing DMP or newly generated DMP) and new part instructions 111 to direct the robotic system 104', or another robotic system 104", to perform the same action and/or task on a new workpiece 106", in same workspace 112 or a new workspace 112', in a subsequent manufacturing and/or assembly operation 113 (shown as 113' and 113" respectively). In the example shown in FIG. 1, system 100 includes a new workpiece fabrication control module 122 that receives the model 107, dynamic movement primitives 109, and the new part instructions 111 to direct the robotic system (e.g., 104' or 104") to perform the manufacturing or assembling operation on a new workpiece 106".

To this end, the system 100 can flexibly generate a model 107 of an existing workpiece 106' as a template or primer workpiece that can then be used in conjunction with the DMP operations to fabricate subsequent workpieces without the need for a CAD model of that workpiece (e.g., without the need for pre-programming or coding the robotic system 104 to perform separate tasks). Computer-aided design (CAD) models, as original blueprints for the workpiece, are subject to change once the design of a given workpiece is moved from the engineering and design team to the manufacturing team. A hole, for example, that may have been initially defined in a part may have moved once the design has been implemented, or a new hole may be determined to be later warranted. The design of a given workpiece may involve multiple inter-related data or files; for example, computer-aided design models for a workpiece 106 may include part models/files for each of the individual parts of that workpiece, assembly models/files of the assembly of such parts, as well as drawing files. Also, in many instances, a manufacturer of a workpiece 106 may provide a sample workpiece from a designer without any models of the workpiece 106. In that instance, the CAD model of the workpiece is often reproduced by the manufacturer to utilize the model in subsequent manufacturing/assembling operations.

In addition to generating the model 107 of the workpiece 106, robot movement data/coordinates and images of the workpiece 106' acquired the user-guided operation of the robotic system 104' may also be used to generate the dynamic movement primitives 109 (referenced as the newly generated DMP above). DMPs are computer-readable instructions of building blocks or primitives for encoding trajectories of a modeled machine as dynamical systems that can be used to generate complex movements in real-time. Additional description of DMPs can be found in Ijspeert et al., "Dynamical Movement Primitives: Learning Attractor Models for Motor Behaviors" (2013) and Abu-Dakka et al., "Solving peg-in-hole tasks by human demonstration and exception strategies," each of which is incorporated by reference herein in its entirety.

As used herein, the term "workpiece" (e.g., source workpiece 106' or new workpiece 106") refers to an article of manufacture, substrate, or platform to be manufactured. The workpiece 106 may include an aircraft fuselage, vehicle frame or panel, boat hull, power generation equipment components such as gas turbine components or wind turbine components, engines, housing components, piping, or any other large-scale manufacturable component that can benefit from multiple sensors or image scans as described herein. Workpiece 106 may have flat, spherical, or arbitrary curves or edges portions. The workpiece 106 may include holes, recesses, and/or attachments.

In the example shown in FIG. 1, the robotic system 104 includes a robotic arm recorder 114, a robotic arm 115, a robotic arm actuator 116, a robotic arm controller 118, a robot effector 119, and a camera 120.

The robotic arm recorder 114 is configured to capture human-guided movements and communicates them with the training system 102. The robotic arm recorder 114 can track and record the location of the robotic arm actuators 116 and/or robotic arm 115 to communicate the recorded data of the actuators 116 or arm 115 to the robotic arm controller 118 to provide to the training system 102. The robotic arm recorder 114 may track the location of the robotic arm actuators 116 and/or robotic arm 115 as coordinate system data or actuator settings in relation to, or synchronized with, acquired images or video data from the camera 120. The robotic arm recorder 114 may be a physical system located on the robotic system 104 or a functional system implemented in the controller of the robotic system 104'.

The robotic arm actuator 116 includes a set of motor-powered components such as electric motors such as AC or DC motors, servo or stepper motors, mechanical motors, electromechanical motors, or any other form of motor that can facilitate the recordation of the human-guided movement. During training operation (e.g., human-guided operation), the robotic arm actuator 116 is configured to maintain the position of arm 115 while allowing external forces applied by the user to adjust its position. During the subsequent production mode, the robotic arm actuator 116 is configured to direct movements or motion of the robot arm 115 and/or robot effector 119.

The robotic arm controller 118 is operatively coupled to the robotic arm recorder 114, the robotic arm actuator 116, and the training system 102. During training mode, the robotic arm controller 118 is configured to receive the captured human-guided movements from the robotic arm recorder 114 and communicate them to the training system 102. During production mode, the robotic arm controller 118 is configured to direct movements or motion of the robot arm 115 and/or robot effector 119 to perform the manufacturing or assembly of a new workpiece 106".

The robotic arm controller 118 may be a local processing unit or other forms of a controller comprising a physical hardware device configured to execute computer-readable instructions. The robotic arm controller 118 hardware may include, but is not limited to, microprocessors, microcontrollers, or application-specific circuits.

The robot effector 119 is a device or component, often positioned at the end of the robotic arm 115, designed to interact with the environment. Example of robot effector 119 may include a gripper or a tool. An impactive gripper may employ a jaw or claw that can physically grasp by direct impact upon the object. An ingressive gripper may employ a pin, needle, or hackle that can physically penetrate the surface of the object (used in textile, carbon, and glass fiber handling). An astrictive gripper may employ electromagnets, magnetics, or vacuum equipment to apply an attractive force to the object's surface, e.g., via vacuum, magnets, or electro-adhesion. Examples of tools that can be employed include drills, cutters, sprayers, welding equipment, and rivet equipment.

In the example shown in FIG. 1, camera 120 is fixably attached to the robot arm 115. In some embodiments, the camera 120 can be mounted in proximity to the robot effector 119.

The training system 102 is configured to utilize image, video, and/or sensor information (interferometry, laser, etc.) acquired from the robotic system 102 to generate a model 107, using computer vision and machine learning and artificial intelligence learning operation of an existing workpiece 106' as a template or primer workpiece that can then be used in conjunction with the dynamic motion primitive data 107 to fabricate subsequent workpieces 106". The training system 102 can also be used to generate libraries of dynamic motion primitives.

In the example shown in FIG. 1, the training system 102 includes a camera calibration system or module 123, a landmark model generation system or module (shown as workspace estimation 124, workpiece model estimation 126, and landmark estimation 130), a landmarks classification system or module 134, a human-guided AI-Training system or module for manufacturing process 136, and a movement primitive analysis system or module 138.

The training system 102 may also employ the acquired data during a user-definable training from a fabrication workspace 112 to generate a set of movement primitive (e.g., DMPs) that can be used to define a set of tasks. Each movement primitive is a template of a protocol or instructions that define a sequence for a movement or set of movements. The movement primitives can be later used by a robotic system, which can be the same robotic system used to acquire the inputs or another robotic system in subsequent fabrication operations.

The camera calibration system or module 123 is configured to align the camera coordinate frame relative to the robot coordinate frame. In some embodiments, e.g., to integrate the camera 120 as an external device to the robotic system, module 123 can employ a real-time stream of images (e.g., RGB images) and depth data to create a virtual point cloud. Module 123 can then translate the point cloud into an accurate estimation of target feature coordinates within the workspace 116' by applying a global reference frame to which iterative samples can be applied.

Module 123 can combine the depth data with the camera intrinsic property information to compute an estimate for the coordinate of each pixel within the camera perspective. By sampling intersection points along a ground truth calibration surface or board, module 123 can establish sufficient reference points to compute the corresponding transform from the image coordinate to the camera location to the robot base coordinates.

Workspace Estimation. The workspace estimation module 124 is configured, in some embodiments, to receive positioning data from the robotic system 102 to define a salient region of the workspace 112'. In some embodiments, two or more coordinate measurements are employed, e.g., at opposing corners. In some embodiments, the salient regions can be defined as a user-defined input, e.g., from a graphical user interface.

Figure 2:
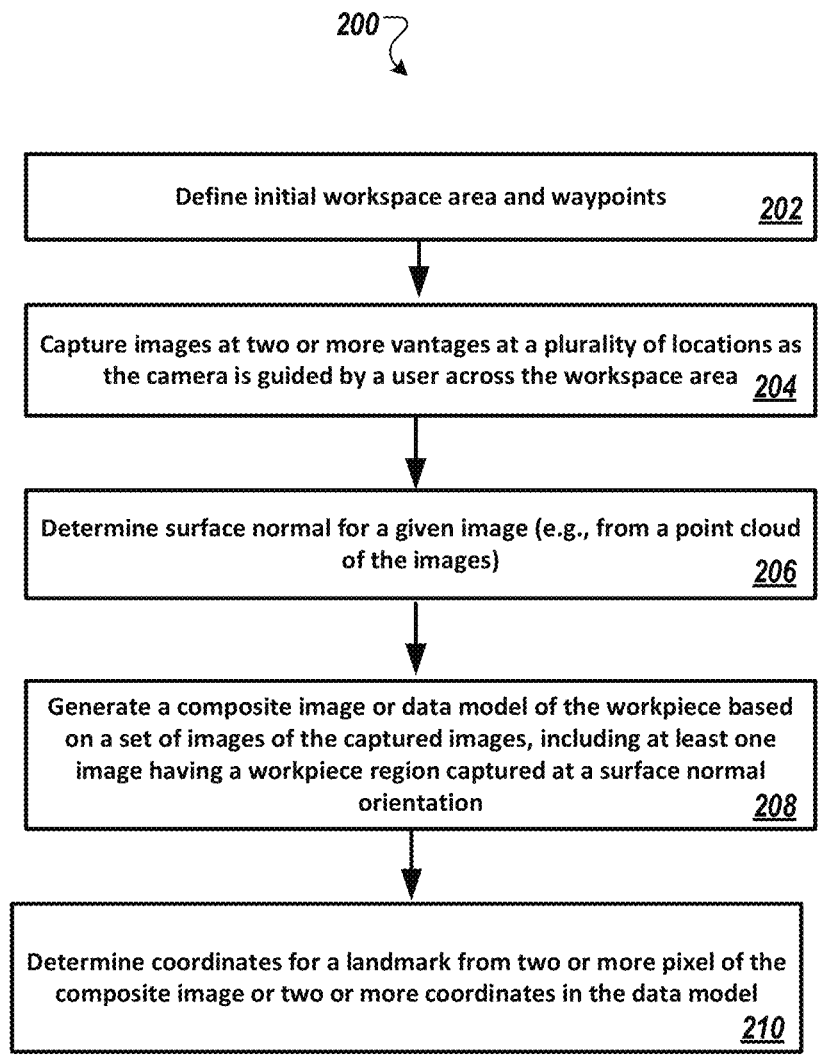
FIG. 2 shows an example method for workspace estimation in accordance with an illustrative embodiment.

FIG. 2 shows an example method 200 for workspace estimation (e.g., via workspace estimation module 124) in accordance with an illustrative embodiment. In the example of FIG. 2, method 200 includes defining (202) the initial workspace area. The operation may be performed using computer programming or human-guided training. For instance, the workspace area may be defined by inputting the workspace area coordinates manually on a computer GUI (graphical or computer user interface). Alternatively, human-guided training, as described herein, can be used to define the initial workspace area. In some embodiments, a user may define the initial workspace area through a workspace sweep process wherein the user assists in moving the robotic system (104) and camera (120) to two or more corner boundaries of the workpiece (106), e.g., to four corners. The number of corners can be established as a user-defined parameter.

Model generation. Referring to FIG. 1, the workpiece model estimation 126 is configured to generate a three-dimensional model 107 of the workpiece 106'. The generated model may include the surface topology information for the workpiece, which can be flat, spherical, or arbitrarily curved. The surface topology can be later updated to include identified landmarks such as holes, recesses, punched areas, welded regions, adhered regions, and other removed areas or regions. The model may be subsequently modified to include attachments that are attached to the workpiece, such as rivets, screws, nails, etc.

FIG. 2 shows an example method 200 of the workpiece model generation module (e.g., 126). In FIG. 2, method 200 includes receiving an initial workspace area per step 202. To generate a model, the workpiece model generation module (e.g., 126) may divide the workspace 116' into waypoints, e.g., a grid of waypoints parallel to the surface. The number and size of the waypoints may be user-defined. Method 200 then includes capturing (204) images at each waypoint or a substantial portion of the waypoints, determining (206) surface normal for a given image (e.g., from a point cloud of the images), and generating (208) a composite image or data model of the workpiece based on a set of images of the captured images, including at least one image having a workpiece region captured at a surface normal orientation.

To perform the planar normal estimation (206), the workpiece model generation module (e.g., 126) can receive images from camera 120 while the robotic system 102 is guided by the user. The workpiece model generation module (e.g., 126) can acquire multiple images at a given waypoint to convert one or more of the acquired images into a point cloud. In some embodiments, the camera 120 is motorized to vary its position in the X, Y, and/or Z axis in relation to the robotic arm 115. The service can superimpose a flat plane tangential to the center of the point cloud. The end-effector 119 can calculate the normal vector of the plane as a quaternion. Subsampling can be performed to improve computational efficiency. Additional description and/or examples of the planar normal estimation can be found in Toris and Kent's RAIL Segmentation code [14].

The training system 102 may apply planar normal estimation techniques such as point cloud estimation, convolutional neural nets (CNN), or single blur estimation to determine the normal plane for a given image. The training system 102 may optionally sub-sample specific regions of the workpiece to increase computational efficiency and assist in finding the local normal surface.

In some embodiments, with the waypoints generated from the initial user-assisted workspace sweep, the workpiece model generation module (e.g., 126) can capture images at each waypoint. The robotic arm (e.g., 115) may be guided by the user to sweep over the workpiece 106' or controlled by the controller (e.g., 118) to perform the sweep. At each waypoint, the robotic arm (e.g., 115) may reorient itself by employing the planar normal estimation service. The training system (102) may then re-evaluate the camera's (120) relative distance to the workpiece (106) and adjust to maximize pixel fidelity while not crossing the minimum range necessary for accurate depth estimation. At each waypoint, the camera 120 may capture multiple images of the workpiece (e.g., 106') from various points of view. For instance, in one approach shown in FIG. 9, the camera captures five images at each waypoint: 1) a picture of the workpiece with the camera angled to the right; 2) a picture of the workpiece with the camera angled to the left; 3) a picture of the workpiece with the camera angled downwards; 4) a picture of the workpiece with the camera angled to the right; and 5) a picture of the workpiece with the camera centered on the workpiece. In taking pictures from multiple points of view, the training system 102 can better compute coordinate estimates, capture depth estimates, and generate a frame of reference for the workpiece model estimation.

One or multiple iterations of the human-guided operations may be performed. In some embodiments, a guided operation can be accepted or rejected by the user. In other embodiments, the guided operation can be recorded to which recordings can be selected for subsequent training.

To reduce noise and partial obstructions, e.g., by the robotic arm (e.g., 115), the training system 102 may apply image processing techniques such as Gaussian smoothing to eliminate individual points that may not render a depth estimate from the image. The training system 102 may convert coordinate estimates taken from the camera's perspective into coordinate estimates in the robot base frame of reference. The conversion between the frames of the reference may be achieved by the system applying camera intrinsic matrices. The training system 102 may parallelly process the coordinate conversion to reduce time-costs incurred from processing large sets of data points. The training system 102 may stitch together the multiple photos taken of the waypoint to capture overlapping features and increase sampling.

To generate (208) a composite image or data model of the workpiece based on a set of captured images, method 200 may include iteratively stitching each model waypoint into the workpiece model 107. The training system 102 may stitch by computing matching Scale Invariant Feature Transform (SIFT) descriptors and filtering the results. The training system 102 may, for instance, filter results by using Lowe's ratio test, further detailed in the experimental results section. The training system may additionally filter out results where pixel pairs are greater than 1 cm apart based on initial coordinate systems. The training system may analyze whether there are a sufficient number of matches between images to compute a robust homography (e.g., >10 matches).

Landmark Estimation and Landmark Classification. Referring to FIG. 1, the landmark estimation (via steps 208, 210), e.g., per landmark estimation module 130, can operate subsequent to or during the model generation operation (206) to identify landmarks on the source workpiece 106, e.g., holes 108, attachments, 110, or other features. The landmark classification operation 210, e.g., per the landmark classification module 134, can be used to identify or classifier the landmarks as a certain type. The landmark estimation module 130 can operate with the landmark classifier module 134 to generate a landmark model 132. The landmark classifier system 134 has been trained to identify landmarks per the example of FIG. 3, e.g., relying on segmented images as inputs to generate the landmark model 132. The landmark model 132 may include coordinates for a landmark, landmark type identifier, and/or size or geometric identifier of the landmark. In some embodiments, the landmark estimation module 130 and workpiece estimation module 126 may be implemented in a single module.

Figure 3:
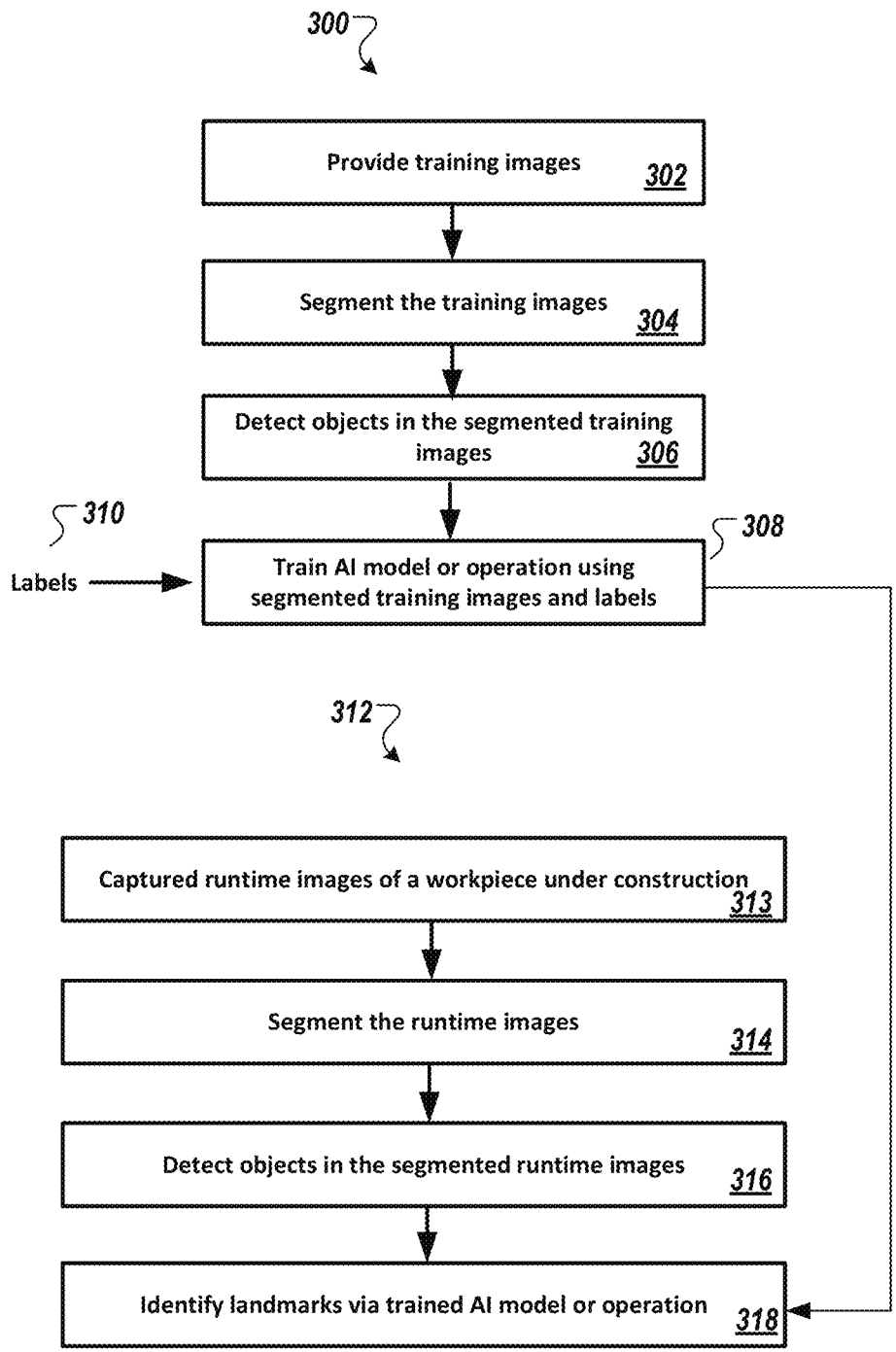
FIG. 3 shows a method of landmark classification that can be applied by the training system of FIG. 1 in accordance with an illustrative embodiment.

FIG. 3 shows a method of landmark classification 300 that can be applied by the training system 102. In FIG. 3, method 300 includes providing (302) training images to the training system 102. Method 300 may include pre-processing to segment (304) the training images. In some embodiments, the segmenting operation can be performed using OpenCV Library or other image processing software, e.g., a blob detection algorithm or other like techniques. The blob detection algorithm, or other techniques, may be employed to identify landmarks of a specific size and to filter out features outside a target landmark size. Method 300 may include detecting (306) objects in the segmented training images such as holes (108) or attachments (110) or other features described herein. When potential landmarks are identified, method 300 may include saving the images of the potential landmarks as well as the location of the potential landmark's center in the robot's coordinate system. The operation may create a pool of potential landmark images and coordinates. Other user-defined landmarks may be additionally defined.

Method 300 may include training (308) an AI model or operation using the segmented training images. Label data is shown provided, which may be pre-determined for a database or derived in this application. In some embodiments, a classifier system such as the Siamese neural network ("SNN") may be employed. Following the training mode, the landmark estimator may be employed in production mode 312 to classify landmarks during the generation of a workpiece model 107. Method 310 may include pre-processing the acquired images (313) to segment (314) the images. Method 312 may include detecting (316) landmarks in the segmented images to be used by the classifier in step 318.

Figure 8A:
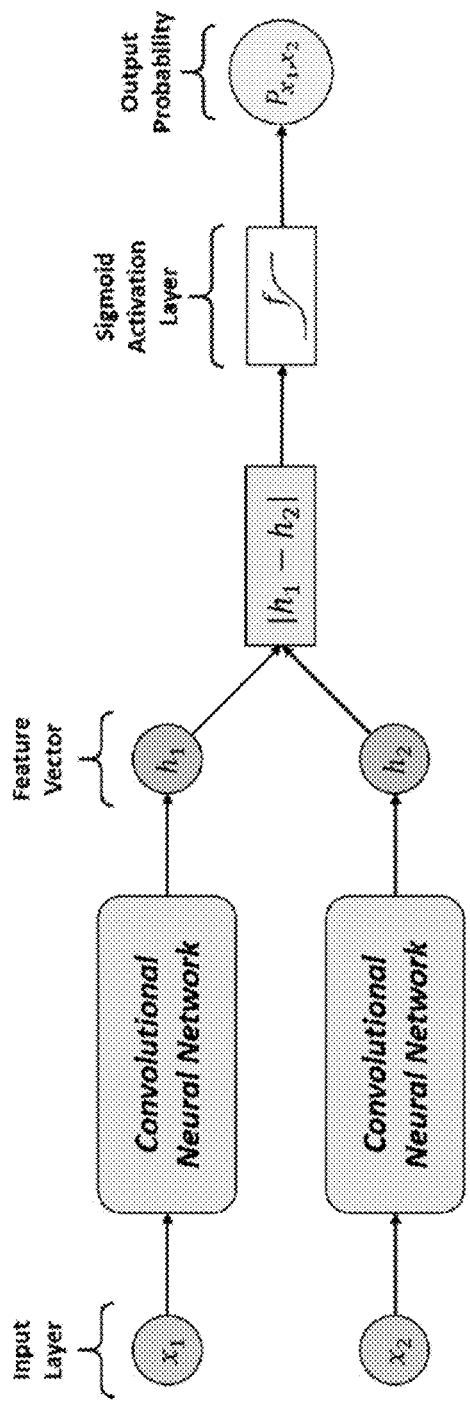
FIGS. 8A and 8B show an example implementation of a neural network employed in the human-assisted AI training system of FIG. 5 in accordance with an illustrative embodiment.
Figure 8B:
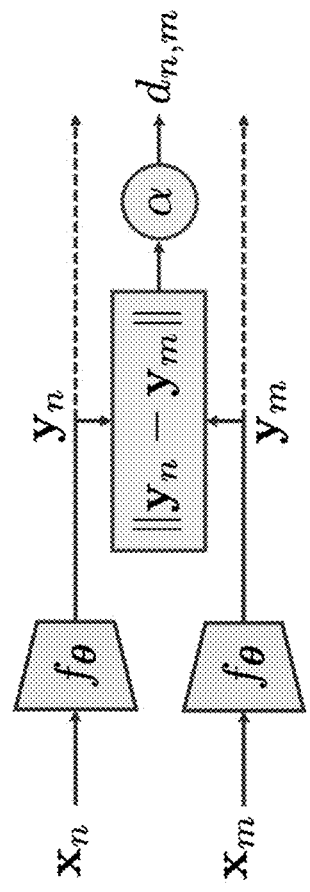

FIG. 8A shows an example implementation of an SNN. FIG. 8B shows a mathematical model of the SNN of FIG. 8A in which $x_n$ is a target or "archetypal" image, $x_m$ is the image of interest, $f_\theta: X \to Y$ is a neural network that embeds the input image into a lower dimensional space, $|X|>>|Y|$, $\|y_n - y_m\|$ is the distance between the two images, $\alpha$ is a weighting parameter. The output $d_{n,m}$ should by higher if two images show different items and lower if the images are similar. Equation 1 shows a loss function that can be used in the training of the SNN of FIG. 8A.

$$L = \sum_n \left( \left( \sum_{m | Class(x_n) = Class(x_m)} d_{n,m} \right) - \left( \sum_{m | Class(x_n) \neq Class(x_m)} d_{n,m} \right) \right) \quad (1)$$

Machine Learning. In addition to the machine learning features described above, the analysis system can be implemented using one or more artificial intelligence and machine learning operations. The term "artificial intelligence" can include any technique that enables one or more computing devices or comping systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as a feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as an input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an ANN is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., error such as L1 or L2 loss), during training. This disclosure contemplates that any algorithm that finds the minimum of the cost function can be used. LR classifiers are known in the art and are therefore not described in further detail herein.

An Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

DMP generated using Human Guided AI-Training. Referring to FIG. 1, the human-guided AI-Training system or module for manufacturing process 136 is configured to coordinate with the robotic arm recorder 114 to receive recorded guided operations, for a set of tasks, performed on a workpiece 106'. Module 136 may subdivide the recorded guided operations into sub-operations to which movement primitives for a given task can be generated. The movement primitive analysis system or module 138 can be employed to generate a set of movement primitive (e.g., DMPs) that can be used to define a set of tasks, e.g., using the generated workpiece model 107 and landmark model 132. Each movement primitive is a template of a protocol or instructions that define a sequence for a movement or set of movements. The movement primitives can be later used by a robotic system, which can be the same robotic system used to acquire the inputs or another robotic system, in subsequent fabrication operations.

Figure 4:
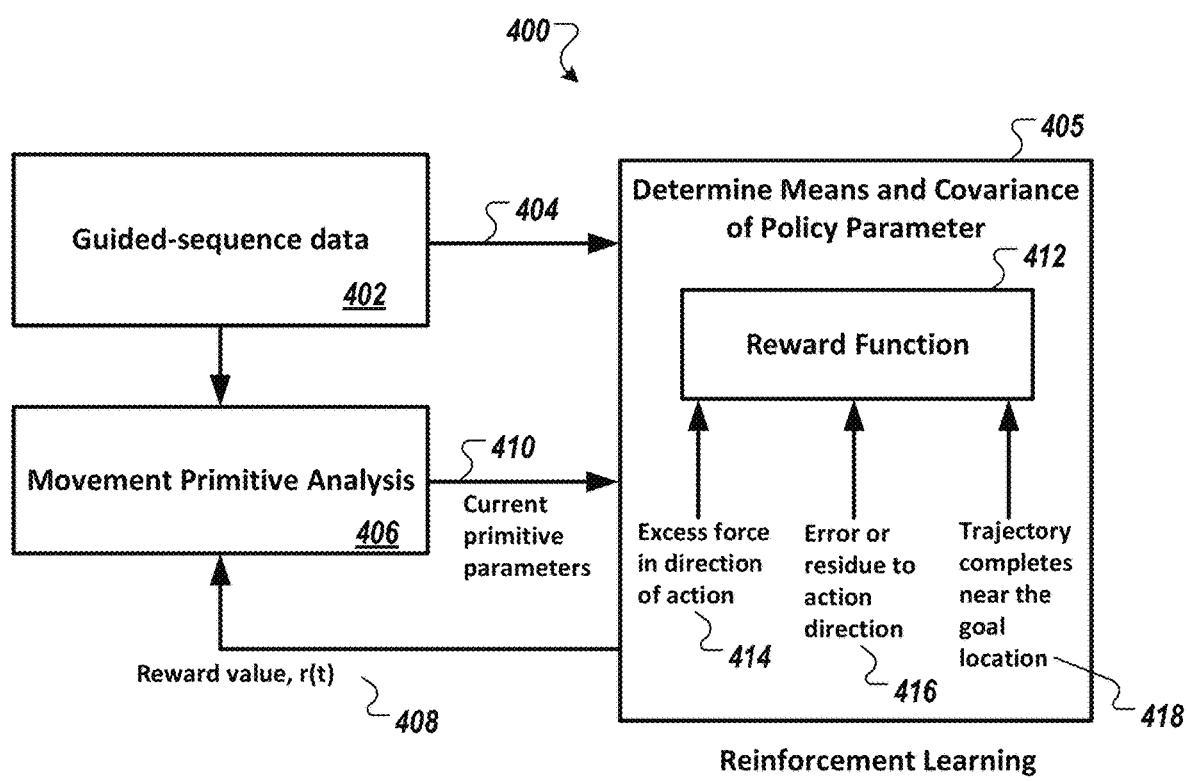
FIG. 4 shows a process to utilize human guided-AI training in a flexible manufacturing or assembly task in accordance with an illustrative embodiment.

FIG. 4 shows a process 400 to utilize human guided-AI training in a flexible manufacturing or assembly task. The human guided-AI training for the manufacturing process shown in FIG. 4 includes inputting guided-sequence data 402. The guided sequence data 402 may include a human-guided demonstration where the human kinesthetically guides the robotic system (104) to perform a variety of tasks, such as inserting bolts. Human-guided sequence data 402 may be captured by the robotic arm recorder (114). The guided-sequence data 402 is input 404 into a policy search method 405, and into a movement primitive analysis 406.

In FIG. 4, the movement primitive analysis 406 receives guided-sequence data 402 and reward value data 408 as inputs to generate current primitive parameters 410. The current primitive parameters 410 are iteratively inputted into the policy search method 405. The policy search method 405 determines the mean and covariance of the policy parameters, in a reinforcement learning operation, to minimize the rewards function. The reward function 412 includes three components, including a first component 414 that punishes excess force in a direction of action, a second component 416 that determines trajectory error or residue to an action direction, and a third component 418 that determines whether the trajectory completes near the goal location of the demonstration. The number of components may be modified. The policy search method 405 can be iteratively or repeatedly performed to tune the reward function.

Example DMP Library. As discussed in the example embodiments of FIG. 1 and FIG. 4, the training system 102 can generate DMPs through user-guided input. In one embodiment, the training system 102 maintains a library or catalog of recorded DMPs. The library or catalog allows the robotic system 104 to perform various tasks without the need for human-guided re-training. The library or catalog can be employed to combine multiple DMPs into more complex tasks or macros. In one example, a first DMP may move the robotic arm 115 from a first position non-adjacent to a workpiece 106" to a second position adjacent to the workpiece. A second DMP may then execute a task by moving the robotic arm, e.g., screwing, fastening, or welding, at the workpiece surface. The user may combine two or more DMPs as a macro to command the robotic arm 115 to execute a task at that section of the workpiece. Other DMPs may also be combined to enable the robotic arm to move across the workpiece and perform different tasks at different locations. Additional DMPs may allow the robotic arm to move to other workpieces 106".

Workpiece Fabrication Control. Referring to FIG. 1. the workpiece fabrication control module 122 is controller configured to receive the model 107, dynamic movement primitives 109, and the new part instructions 111 to direct the robotic system 104' to perform the manufacturing or assembling operation on a new workpiece 106". In some embodiments, the workpiece fabrication control module 122 includes instructions to generate a schedule or sequence to execute a robotic arm actuator 116 to perform a set of tasks on the new workpiece 106". The workpiece fabrication control module 122 may define the instructions to generate a schedule or sequence using sequence operation derived from the movement primitives.

Experimental Results and Examples

A study was conducted to employ collaborative human-robot design in a flexible manufacturing operation and environment to generate an example DMP that includes drilling and fastening tasks. The DMP can be flexibly adapted to new environments (e.g., different workspace area, different robots, different parts). In the study, a human-operator can guide a robot to provide a set of recordings that can then be used to train the robot for the generation of the DMPs. The study configured its training system to complete a task autonomously by using human-operator input to define the robot's working environment and to receive human-guided robot demonstrations as how to locate, classify, and insert an operating component to a workpiece, specifically, inserting fasteners into a fuselage of an airframe component. In the study, the training system was provided with no information and used offline and online learning techniques to develop a data bank of relevant information to improve the insertion process within the workspace. Results of unit tests of an evaluation of the trained system, including the multiple steps to the learning-execution process, are provided.

Manufacturers are increasingly incorporating automation into their production lines to task machines with performing labor-intensive processes and meet growing demand. This automation predominantly involves the usage of the large monument and gantry-style machines that are fed manually [1]. While such structures have improved production volume and quality, these machines offer low versatility, take up a large amount of space, and cannot automate tasks that require maneuvering through an unfamiliar workspace. Developing such automation that caters to changing, dynamic environments is a hard and open problem. An object of the study was to provide a collaborative approach to human-automation interaction that enables machines (i.e., robots) to be trained using human demonstrations and improve their performance over time through reinforcement learning. Moreover, the developed system of the study was configured to function under changing environments to allow the incorporation of human expertise to perform dexterous manipulation tasks.

The study allowed a human expert to demonstrate and teach various steps of an aircraft assembly process to a robotic system, grounded in an application to robotic fastener insertion for a large-scale aircraft. A goal of the study was for humans to need only to provide a few demonstrations of the tasks so experts may retrain the system for other applications quickly and because humans cannot provide thousands of demonstrations. Rather than employing deep learning approaches at a global level that may require large training sets, the study developed sub-components in which each individual component can solve a task with classical approaches (or a hybrid of such classical approaches with AI).

The study used a combination of computer vision, dynamic movement primitives, and reinforcement learning to learn a pipeline that can take human demonstrations to learn to insert fasteners into different types of holes on a curvilinear surface of a workpiece where the positions and shapes of the surface were unknown, and no CAD model was provided. Rather than achieving this assembly task purely from an automated approach, the study incorporated human involvement in the system not just as a means of monitoring for mistakes, but also as a robot programmer using demonstrations.

It can be observed from the study that a developed system can define a workspace, classify and localize fastener holes, and be taught a low tolerance insertion task with a single or few demonstrations, which was subsequently updated via additional processing to improve such insertion over time. Each step of the system involved learning from an expert demonstration.

Figure 5:
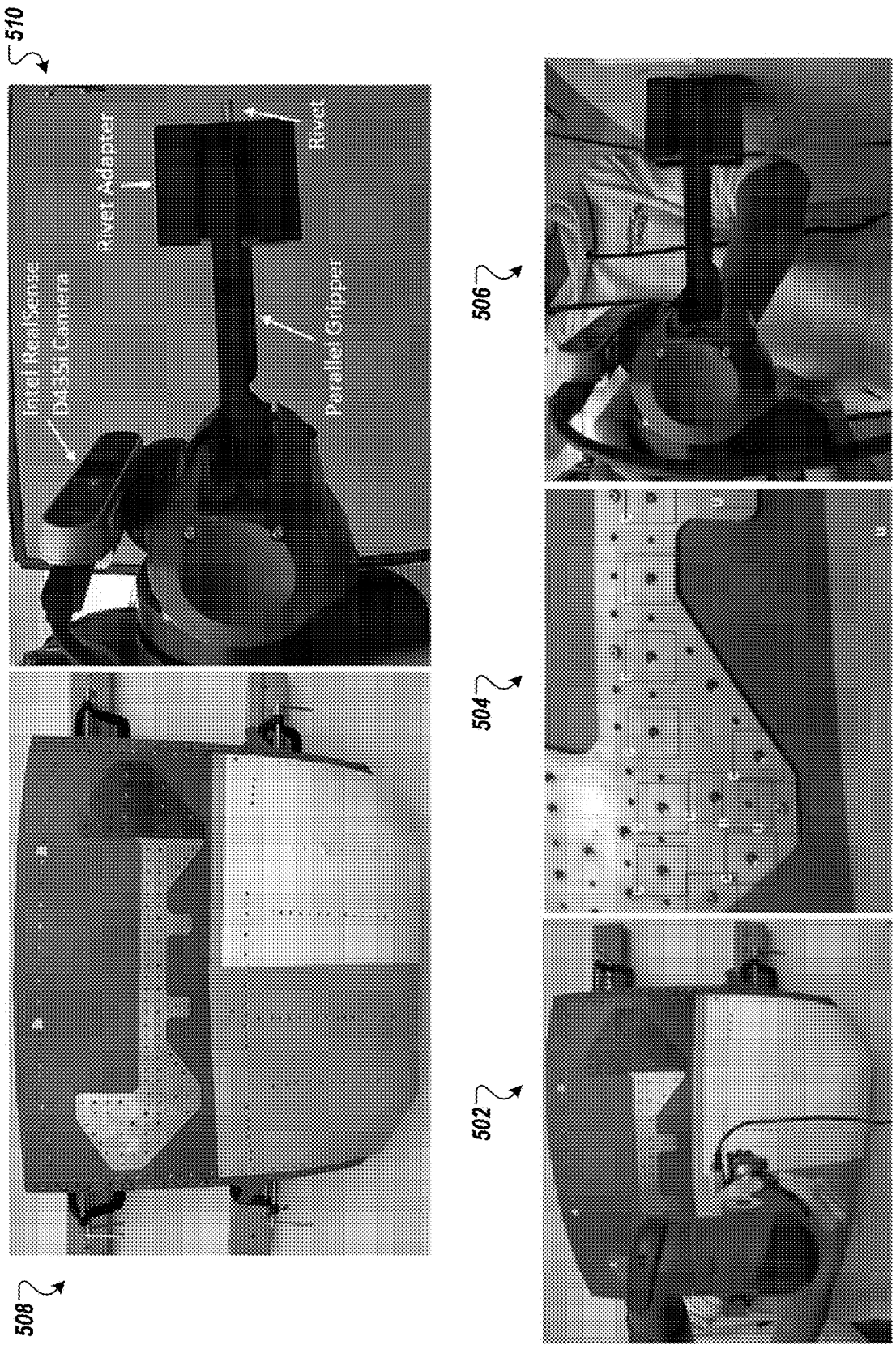
FIG. 5 shows an overview of a system used in a study to employ a human-assisted AI training system in a flexible manufacturing system in accordance with an illustrative embodiment.

FIG. 5 shows an overview of a system used in a study to employ human-assisted AI training in a flexible manufacturing system. The study employed and evaluated methods to capture; methods to approximate normal alignment to the curvilinear surface; methods to classify images via supervised learning data set initialized with user input; methods to localize hole coordinates to a common world coordinate frame; methods to refine demonstrated fastener insertions via reinforcement learning; and integrated method that incorporated all previously mentioned contributions in a manner flexible to new environments.

Study overview. FIG. 5 depicts an overview of the system developed and evaluated in the study. The study employed the system using human-defined workspace boundaries (502), collected images and prompted the user for classification input before learning to classify on its own (504), and directed through reinforcement learning a robot to perform a demonstrated insertion (506).

The study provided an approach to applying supervised and reinforcement learning techniques with a collaborative robot to complete drilling and fastening tasks in final aerospace assembly. The system tasks included inserting fasteners into chamfered and unchamfered holes on a custom-built section of an aircraft fuselage. Starting with no knowledge of the workspace, the system leveraged human demonstration to intake information about the environment. The system learned from the human operator and improved its ability to interact with the workspace. The study overcame challenges posed by the use of relatively inexpensive vision and robotic equipment by employing calibration checks and methods to improve the accuracy of real-world position estimations. From the collected data, the system refined an insertion policy that mitigated the negative effects of kinesthetic teaching, resulting in a smooth insertion into both hole types.

Example System Layout. For this task, the study used a custom-built section of an aircraft fuselage, known as a "coupon", as a test bed. The coupon was 0.9 m by 0.9 m and contained over one-hundred drilled holes. Each hole was either a "countersunk" hole with a chamfered rim or a "buttonhead" hole without a rim. The holes were ~4 mm in diameter. The coupon had a curved surface corresponding to a rounded section of a fuselage of an airframe. To mimic the types of colors that may be seen in factory metal, the coupon was painted in white, yellow, green, brown and metallic (unpainted) sections. Several intentional markings were left on the coupon that could potentially be mistaken for holes to evaluate the accuracy of the classification operation. For stability and to simulate the working on an aircraft, the study mounted the coupon vertically to a wall; that is, there was no gravitation advantage associated with the insertion operation. FIG. 5 shows the coupon (508). Two types of fasteners (countersunk and buttonhead) were either used for each of the holes. The fasteners had a diameter of ~3.8 mm, giving each hole tolerance of ~0.2 mm.

The algorithms used in the study were implemented on the Sawyer robot from Rethink Robotics. The Sawyer's robotic arm has 7-DOF (degree-of-freedom) and is capable of learning trajectories from a demonstration. The end-effector of Sawyer included a parallel gripper with two sliding plastic fingers. A custom 3D-printed part was attached to the gripper to enable it to hold rivets.

For the computer vision system, the study utilized a RealSense D435i RGB-D camera with a gyroscope. The camera could capture RGB and depth data to create a point cloud from them. The system used the data to visualize and localize the hole locations. The system optionally included a gyroscope to assist in camera calibration. FIG. 5, diagram 510 shows a parallel gripper, configured with the camera, holding a rivet.

Vision System. The study assumed the expected size of a fastener hole would be known prior to beginning operation. The vision system limited its search for holes to round hole-shaped objects of the approximate expected size of a fastener, though it could have been adapted to search for other hole sizes. The study assumed the system would operate in a well-lit environment to ensure quality image capture and to be consistent for classification.

The study employed a relatively inexpensive camera to keep costs low while correcting for errors with computer vision strategies. The study did not use any pre-existing set of data for classifying holes. The data set for hole classification was created from user batches.

Workspace Navigation. Along with not beginning with any pre-existing data, the system in the study did not receive a CAD model of any known dimensions of the part at any time during the training. The workspace was instead defined and mapped by a combination of the robot's known end-effector coordinates and RGB-D data captured by the vision system's camera. The study implemented insertion on a robot arm that is prone to slippage. The study compensated for its own inherent reproducibility errors with reinforcement learning techniques later described below. The workspace location remained rigidly fixed during training and insertion.

Human User. The human user employed in the study was an expert demonstrator and skilled at giving precise demonstrations to the robot. The level of expertise was expected to be higher than that of a novice user. Additionally, the human user was only responsible for training the system.

Figure 6:
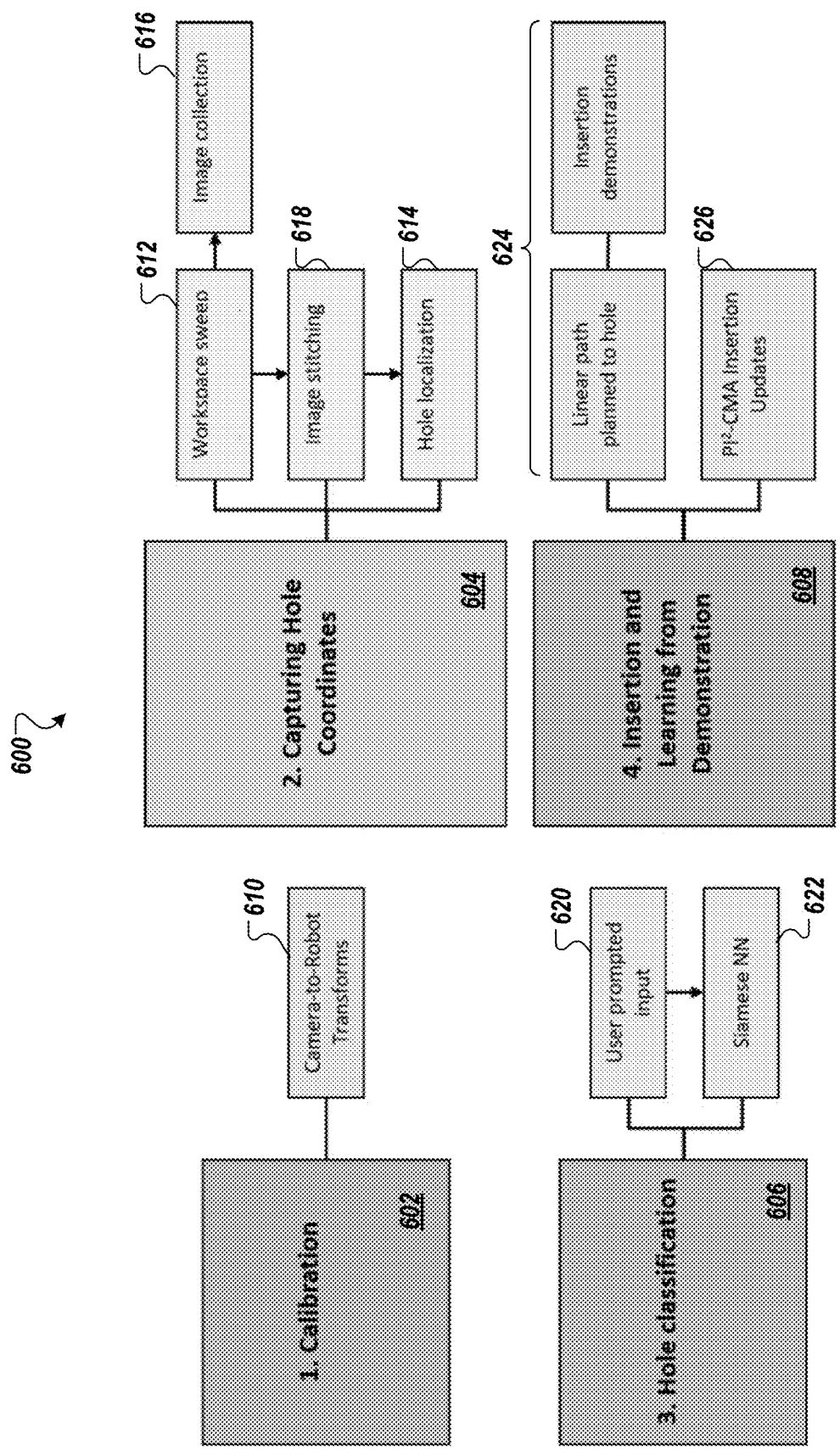
FIG. 6 shows a flowchart of an example process module of the human-assisted AI training system of FIG. 5 in accordance with an illustrative embodiment.

Methods. The study constructed the system by capturing hole locations, classification, and demonstration components. Calibration techniques were completed prior to operating the system. The preparation was followed by capturing hole coordinates. The sweep component handled gathering information and images of the workspace, which were later processed to map and localize holes. The classifier identified and labeled holes. The insertion demonstration component facilitated learning to perform an insertion before refining that movement through reinforcement learning techniques. Each section involved interaction with a human expert to facilitate learning how to fully accomplish the task. FIG. 6 shows a flowchart 600 of an example process.

Calibration (602). The RealSense D435i RGB-D camera generated a real-time stream of RGB and depth data to create a virtual point cloud. The system translated, via a camera-to-robot transform 610, the point cloud into an accurate estimation of target feature coordinates within the workspace by applying a global reference frame to ground iterative sample estimates from vision. The study manually attached the camera to the robot end-effector, facing outward over and parallel with the direction of the gripper. In the study, the camera was not an intrinsic part of the robot. The system performed a calibration process to align the camera coordinate frame relative to the robot coordinate frame.

The study developed estimation of the camera transform by calibrating relative to a level surface with an image of a checkered 10×10 calibration board with 20 mm tiles. The camera combined depth data with the camera intrinsic property information to compute an estimate for the coordinate of each pixel within the camera perspective. The system required a minimum depth of 30 cm to receive accurate information from the camera. By sampling intersection points along the ground truth calibration board, the study established sufficient reference points to compute the corresponding transform from image coordinate to camera location to robot base coordinates.

Capturing Hole Coordinates (604). The study positioned the camera close to the minimum range of the depth sensor (30 cm) and aligned the camera normal to the area of interest to facilitate high-fidelity estimations of hole coordinates because the coupon itself was non-planar. In addition, the study evaluated sampling multiple estimates within the same region to cover regions that might have been obstructed from view by the gripper and increasing sampling by observing each hole from multiple local points of view. To construct a complete representation of hole coordinates across the coupon, the study employed a two-part process where the camera attached to the end-effector incrementally swept across the workspace, stopping in each discretized region to align with the updated surface normal and rotate the camera to obtain additional samples.

Figure 7:
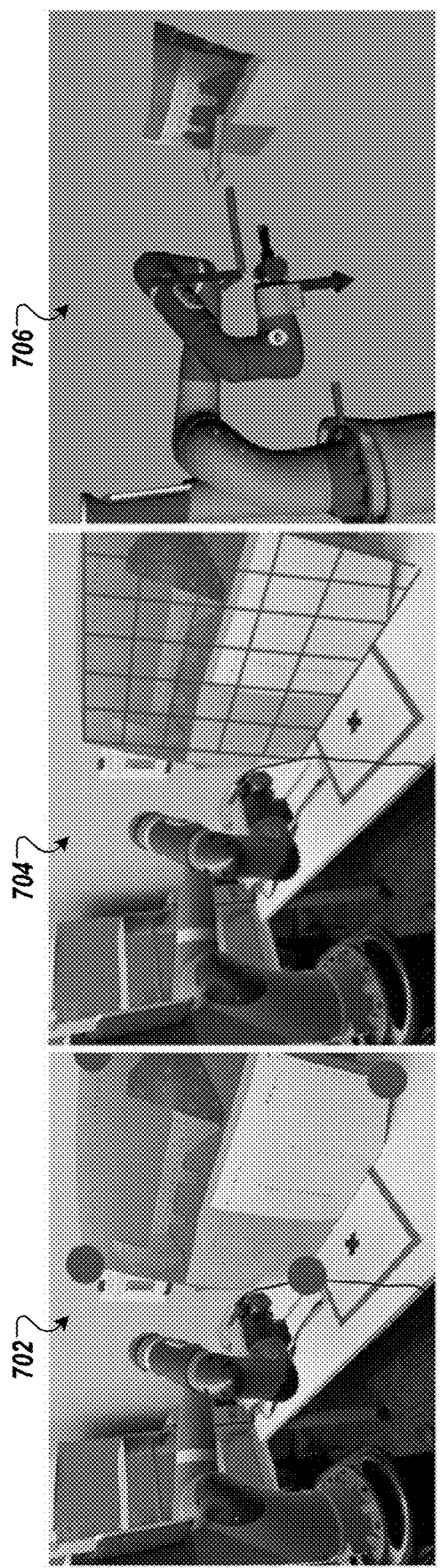
FIG. 7 depicts an example workspace sweep process used by the human-assisted AI training system of FIG. 5 in accordance with an illustrative embodiment.

FIG. 7 depicts an example workspace sweep process. In FIG. 7, the user had defined (702) the boundaries, and the system interpolated (704) a grid of waypoints to maneuver within that space. The system used normal estimations (706) to maintain alignment to the curved surface at each waypoint.

Sweeping the Workspace (612). To define the salient region of the workspace, the human expert taught the boundaries of the coupon to the robot by manually moving the end-effector to its four corners. These positions were provided to the robot and were then interpolated to create a grid of waypoints parallel to the surface of the coupon. A visualization of this process is shown in diagrams 702, 704.

To ensure that the gripper remains aligned to the curved surface of the coupon, the system included a planar normal estimation service adapted from Toris and Kent's RAIL Segmentation code [14]. The service took in the observed point cloud and superimposed a flat plane tangential to the center of the point cloud. The end-effector received the normal vector of the plane as a quaternion. Subsampling was performed to improve computational efficiency. Diagram 706 shows in simulation the normal estimation from the RGB-D point cloud, illustrated as the green arrow pointing away from the coupon.

Hole Localization and Mapping (614). After defining waypoints distributed evenly along the workspace, the study iteratively compiled a robust estimation of hole locations with each subregion and mapped into the global coordinate frame of the robot base. At each waypoint, the gripper first reoriented itself by employing the normal estimation service. The end-effector then re-evaluated its relative distance to the coupon, adjusting to maximize pixel fidelity while not crossing the minimum range for depth estimation.

Figure 9:
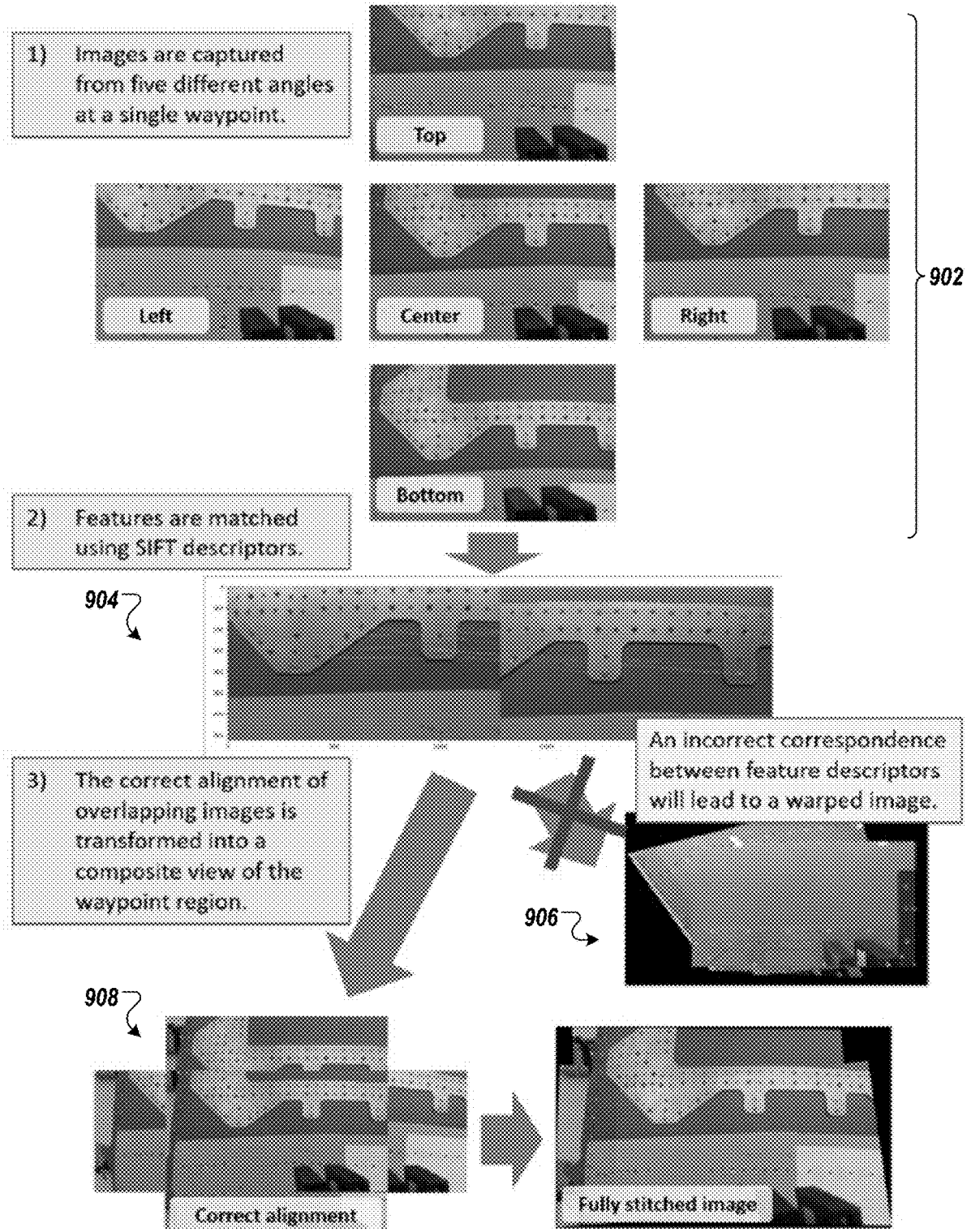
FIGS. 9, 10, and 11 each shows aspects of an example method to generate a workpiece model using the human-assisted AI training system of FIG. 5.

At each waypoint, a set of 5 images was captured (616), each with the camera tilted slightly to provide a different point of view of the coupon (i.e., top, bottom, left, right, and center) (FIG. 9). Within a single image, the depth estimation exhibited expected noise given the relatively inexpensive camera and partial obstruction by the gripper extension. The system applied a Gaussian smoothing operation to eliminate individual points that may not render a depth estimate. The system applied camera intrinsic property data from each depth image to facilitate computing coordinate estimates in the camera's perspective and to facilitate translating to the robot base frame of reference. Despite the high number of data points, the process was performed in real-time due to highly parallelizable computation. The study then increased the sampling size by having the system capture overlapping images within the same region and aligning coordinate estimates via stitching on matched image features.

To stitch overlapping images (618), the system may first compute matching SIFT descriptors and filtering by Lowe's ratio test [15], which was empirically tuned to 0.75. In this implementation, the system adopted the SIFT algorithm provided by the OpenCV Library [16]. In addition to passing the ratio test, the study had the system's matching pair of pixels to be within 1 cm of each other based on coordinate estimates. Such an approach facilitated resolving homogeneity issues while allowing a wide range of noise with respect to initial coordinate estimates. The study checked whether there existed a sufficient number of matches to compute a robust homography (i.e., more than 10) between images. The study applied multiple images from the same region to iterate stitching together a larger map of the region and improve estimates for all potential hole coordinates. With the pixels aligned across samples, the study averaged the coordinate values when estimates were available from both images. The study repeated this process at each waypoint to iteratively build a composite view of the coupon and a map of coordinates for each pixel in the robot's base frame. This enables the study to search the pixel space for target holes and identify their corresponding target coordinates in 3-D space.

Hole Classification (606). Referring back to FIG. 6, to extract candidates for hole locations, the study employed a blob detection algorithm and restricted blobs found by area close to the expected hole size. In this approach, the system segmented potential hole images from the captured stitched images using a square border that scaled with the distance to the part to ensure that the segment was always large enough to contain the known hole size and a small buffer zone. These image processes were also implemented using the OpenCV Library [16].

All potential hole images were saved with the center of the hole's estimated location in the robot's world coordinates and the section of the coupon the hole belonged to, then kept track of as "unlabeled hole objects." From this pool, 20 randomly chosen objects were presented to the human expert for classification. The human entered (620) labels for these 20 images, whose confidence level becomes 100% by definition and are added to either a training or testing set or are thrown out if classified as unidentifiable (e.g., a marking mistaken for a hole or an image containing multiple holes).

The study employed the training and testing sets to train (622) a Siamese neural network (SNN). SNNs have been shown as an effective architecture for one-shot learning since their creation [17]. The SNN operates by using two identical convolutional neural networks that can create a weighted score of an input image. An unlabeled target image and a labeled image are input into each CNN, the outputs of which produce a feature vector. The distance between those feature vectors was calculated by taking the absolute value between them. This was repeated for all labeled images of different classes, finding a distance to the target image and using that distance to compute a similarity score between 0 and 1. The target-labeled image pair with the highest score was assumed to have come from the same class, so the target image was labeled as such. FIG. 8A shows an abstracted layout of the Siamese neural network; FIG. 8B shows an example mathematical representation of the network. This design was based on the network by Koch et al., the details of which can be found in their paper [17].

The study employed the resulting SNN model to classify future hole images collected from sweeping the workspace. As more data was classified, a subset of images with low confidence values was presented to the user to classify again. This new data then retrained the SNN, which in turn reclassified all low-confidence images. The process was repeated until all images were classified. The study iteratively performed this process, training on less than 100 holes. In one approach, the study included SSNs to facilitate training an classifying hole types. The SSN being able to add labels to the training set and retrain the networks Insertion and Learning from Demonstration (608). Referring back to FIG. 6, to have the platform work safely and robustly in the presence of human users, the study system employed data from human demonstrations as the data sets of valid trajectories to facilitate safe and naturally legible motions [18] for these insertions. The human demonstrations in themselves do not provide sufficient precision to perfectly and reliably insert fasteners. Reinforcement learning was improved to improve our bolt insertion policy.

Initialization (624). The human demonstrations were provided to the system by kinesthetically guiding the robot's arm to insert a bolt held in the robot's grippers inside a set of holes spaced around the coupon. Each expert demonstration was encoded to the system via DMPs to facilitate later modification. The Sawyer robot had 7 joints, each represented by a DMP with 10 basis functions for a total of 70 basis functions. The demonstrated DMPs in themselves were able to insert the bolt into the holes in the coupon, but they were occasionally inaccurate and the bolt regularly collided with the hole during insertion. The collisions were predominantly because the tolerance between the hole and the bolt was low and human kinesthetic demonstrations can be noisy as the humans have to balance the weight of the robot arm during insertion. To this end, having the system copy movement produced by a demonstrator is likely insufficient.

Insertion Policy Improvement (626). To improve the provided demonstrations, the study segmented the insertion trajectory into parts, including (i) a first part defining the length of the insertion trajectory that leads from a fixed starting point to ~3 cm outside of a hole and (ii) a second part for the remainder of the insertion into the hole. The first half of the trajectory was performed employing a linear interpolation of trajectory waypoints that moved the robot from a set starting position to an offset position from a target hole. The second half was demonstrated by the expert and optionally included the algorithm Path Integral Policy Improvement with Covariance Matrix Adaptation (PI2-CMA) by [19]. $PI^2$-CMA is a policy search method that can learn the means and covariance of the policy parameters that minimize expected future costs, which is equivalent to maximizing expected future rewards. The policy parameters applied by the system in the present study were the parameters of the DMPs being learned. The system used $PI^2$-CMA to facilitate sampling with fewer demonstrations than other end-to-end methods.

The reward function of the system had three components per Equation 2.

$$r_t = -\sum_{t=0}^{T-1}\left(e^{|f_z(t)-f_c|} + e^{\|g_{[y,z]}-p_{[y,z](t)}\|_2}\right) - e^{\|g-p(T)\|_2} \tag{2}$$

The first component, $e^{|f_z(t)-f_c|}$, disincentivize excessive forces in the direction of insertion; this can ensure that the robot did not try to push against the coupon as a safety measure in which $f_c$ is the baseline constant force that the sensor experiences (selected as $f_c$=5 N for the experiment), and $f_z(t)$ is the measured force. The second component of the reward function, $e^{\|g_{[y,z]}-p_{[y,z](t)}\|^2}$ promotes a trajectory that does not deviate perpendicularly to the direction of the insertion in which $g_{[y,z]}$ is the measured trajectory and $p_{[y,z](t)}$ is the calculated normal vector from the hole. The final component, $g^{\|g-p(t)\|^2}$ promotes a trajectory completion near the goal location of the demonstration.

The study initiated the DMP parameters using data from the expert demonstration. The system policy was then modified with $PI^2$-CMA by fine-tuning the weights along with the specified reward function for learning. This process required fewer than 10 iterations to converge when started from an expert human demonstration. The final policy was a smooth insertion without touching the walls of the hole in the coupon.

Experiment Results. The study evaluated each component of the system individually to address issues localized to a single hardware or software implementation, including evaluation of the multi-view image stitching operation, hole classification, and insertion policy learning.

Multi-View Image Stitching. In the study, for each waypoint, the system captured multiple images of the coupon taken from different angles to aggregate a coordinate map. FIG. 9 shows (902) a representative sample of images taken from a waypoint. The collection of sample images taken from a waypoint were matched (904) using SIFT descriptors to create a composite view of the region.

Figure 10:
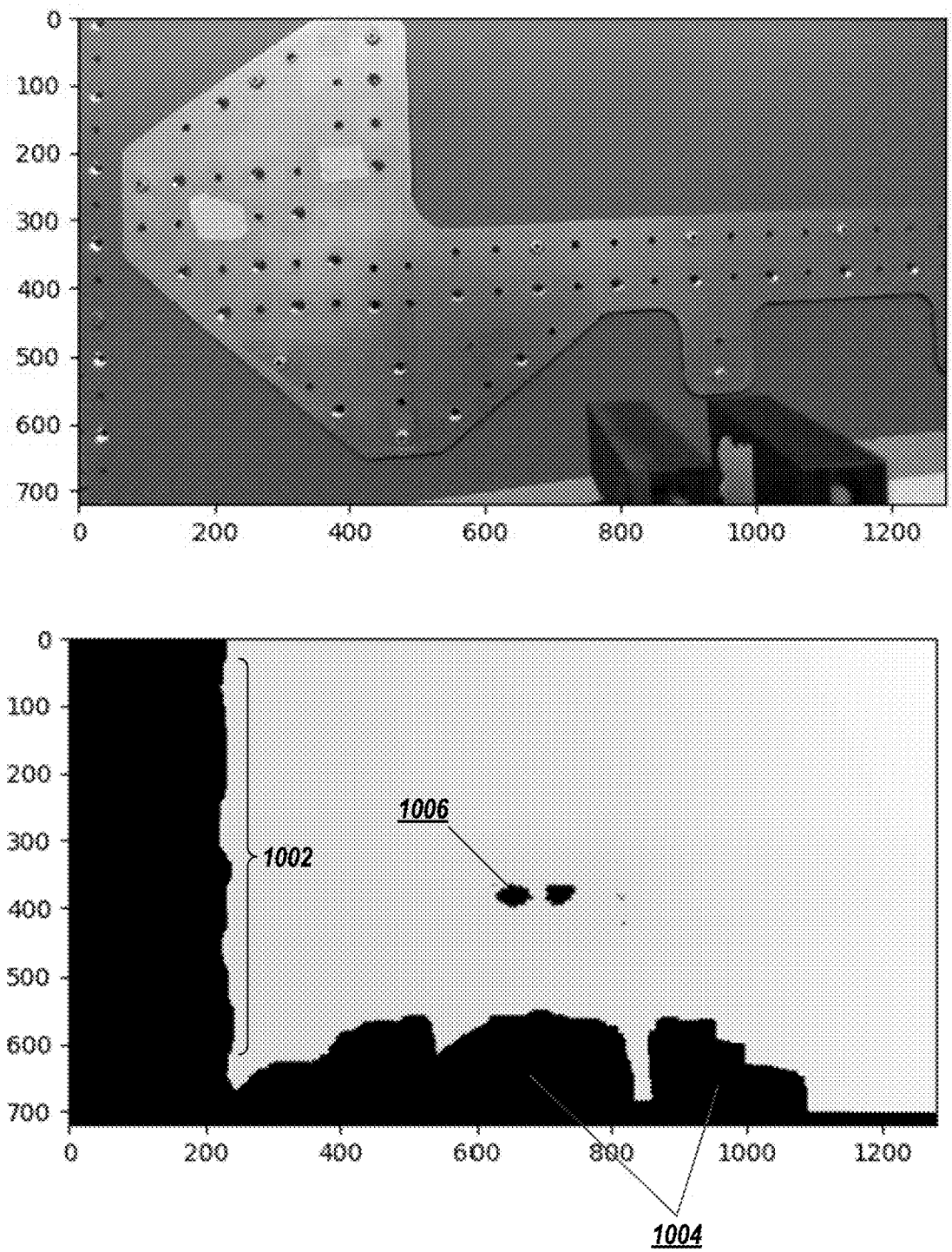

FIG. 10 shows an example captured image and the corresponding smoothed estimation for the depth on a grayscale gradient. To produce the coordinate estimates, the study smoothed the system's depth estimation data to produce coordinate estimates from calibrated transforms to global robot coordinates. The system then applied an adjusted feature matching operation to perform coherent image stitching and robust sampling across the hole coordinates. The resulting images were then passed through a hole detection algorithm to retrieve the corresponding coordinates.

In FIG. 10 (bottom), a depth map from a single image is shown after smoothing. The black region indicates areas where a depth estimate could not be produced due to stereo sampling (1002) or gripper obstruction (1004). Some reflective surfaces on the coupon also led to a lack of sampling (center) (1006).

To stitch multiple images together and create a more accurate RGB and depth image from which to locate hole locations, the study required feature mapping to identify the correct homography between two images. FIG. 9 shows (906) that homogeneous features on images may lead to incorrect pixel matching. Since much of the image looks the same, features used by descriptors are the same or similar because descriptors often have a one-to-many correspondence between images. Incorrect correspondence matching results in incorrect homographies and distorted image-to-image mappings. After adjusting the criterion with a feedback loop to require both matched features and close coordinate estimates, the study addressed matching homogeneous features to produce accurate homographies for image transforms as shown in FIG. 9 (908).

Prior to the enhancement, the RGB-D images would contain inconsistent data between captures of the same area. For example, consider two images (A) and (B) taken of the same area of the coupon. For a single hole found in the image (A), the real-world Cartesian coordinate estimate may position the hole at $loc_A$. Similarly, retrieving a real-world estimate from image (B) may yield $loc_B$. Ideally, $loc_A = loc_B$ as they are of the same hole. However, the distance between these estimates can vary (e.g., between 0.1-0.4 mm as observed in the study). Since the fastener holes themselves only have a tolerance of ~0.2 mm, this can cause issues. By employing multi-view image stitching, it was observed that the variance between repeated measures of the same hole was reduced to an acceptable value.

Figure 11:
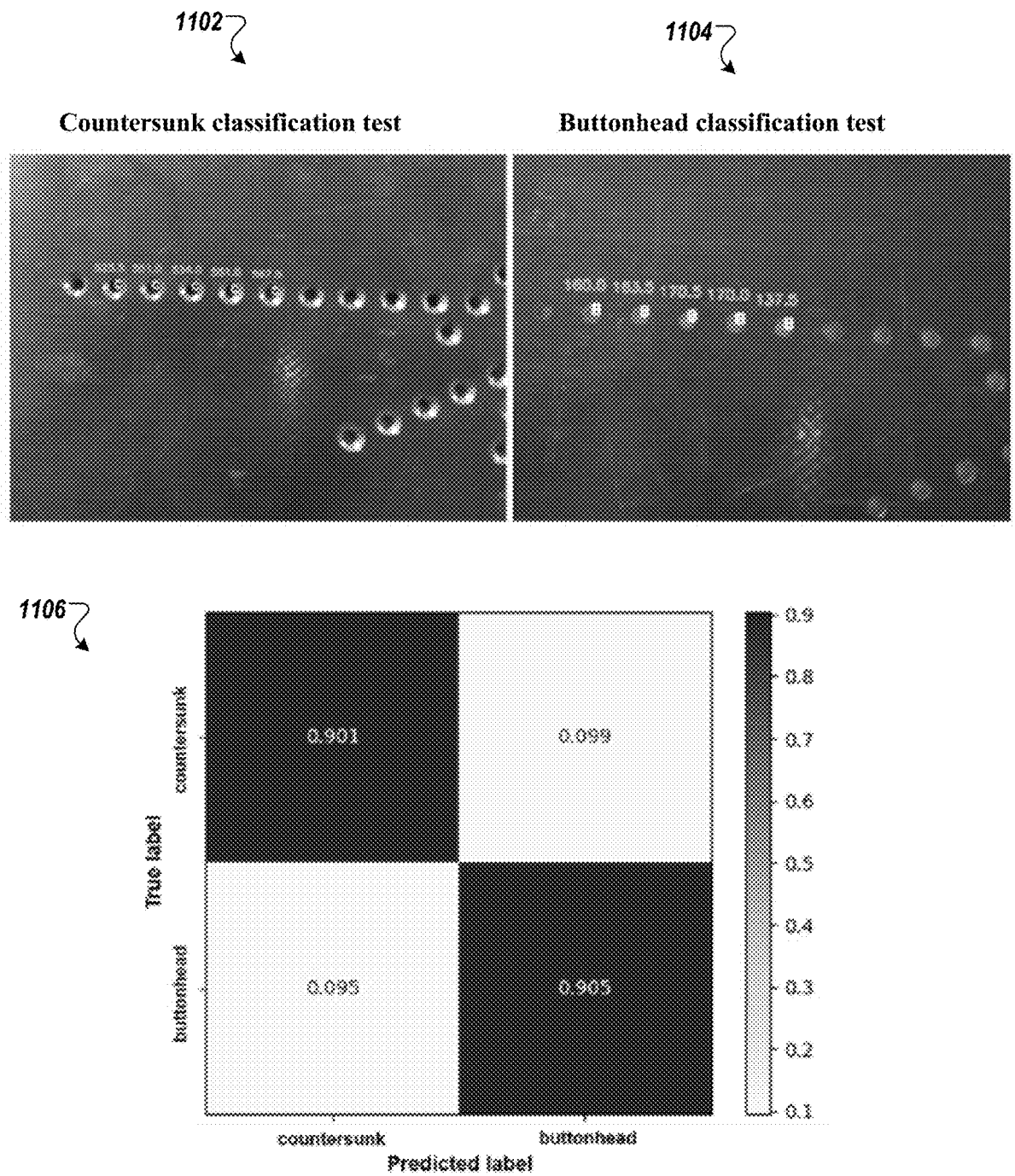

Classification Test. The study first implemented the Siamese neural network from and trained it on a sample set of classified hole images. The classifier was placed in a continuous loop and fed input from a live camera feed that found and segmented hole-shaped objects of the expected diameter. Using flat metal sheets lined with countersunk and buttonhead holes, the study tested the classifier to label the video feed in real-time. FIG. 11 shows the results of the classification. Diagrams 1102, 1104 show the classification labels "c" and "b" superimposed over the countersunk holes and the buttonhead holes. The number shows the estimated size of the hole (in microns). Plot 1106 shows a confusion matrix from 1000 one-shot classification tasks completed by the SNN trained on 30 samples.

Next, the study evaluated the vision system operation on the coupon and its adjustments to account for the colored portions. The network was trained on a sample set of 30 labeled hole images and then evaluated on random-one-shot pairs created from a larger data set of withheld labeled images. The study observed classification accuracy of over 90%. The confusion matrix (per plot 1106) shows the SNN evaluation from this classification.

Insertion Policy Tests. The insertion policy can address or reduce inaccuracies of imitation learning by itself. To show this, the study trained a robot to insert a single rivet into both chamfered and unchamfered holes. The study then attempted to recreate the insertion via imitation learning alone. It was observed that the insertion was successful on the countersunk hole but did not yield a clean insertion as it used the chamfered edges as a guide. The initial insertion policy learned just from the demonstration was not successful on the buttonhead hole as it missed and dragged the rivet down the side of the coupon.

The study modified the system after the initial imitation learning insertions using the reinforcement learning policy for insertion per Equation 2. It was observed that after a low number of iterations of training (i.e., less than 10), the robot could successfully complete a clean insertion on both types of holes.

Figure 12:
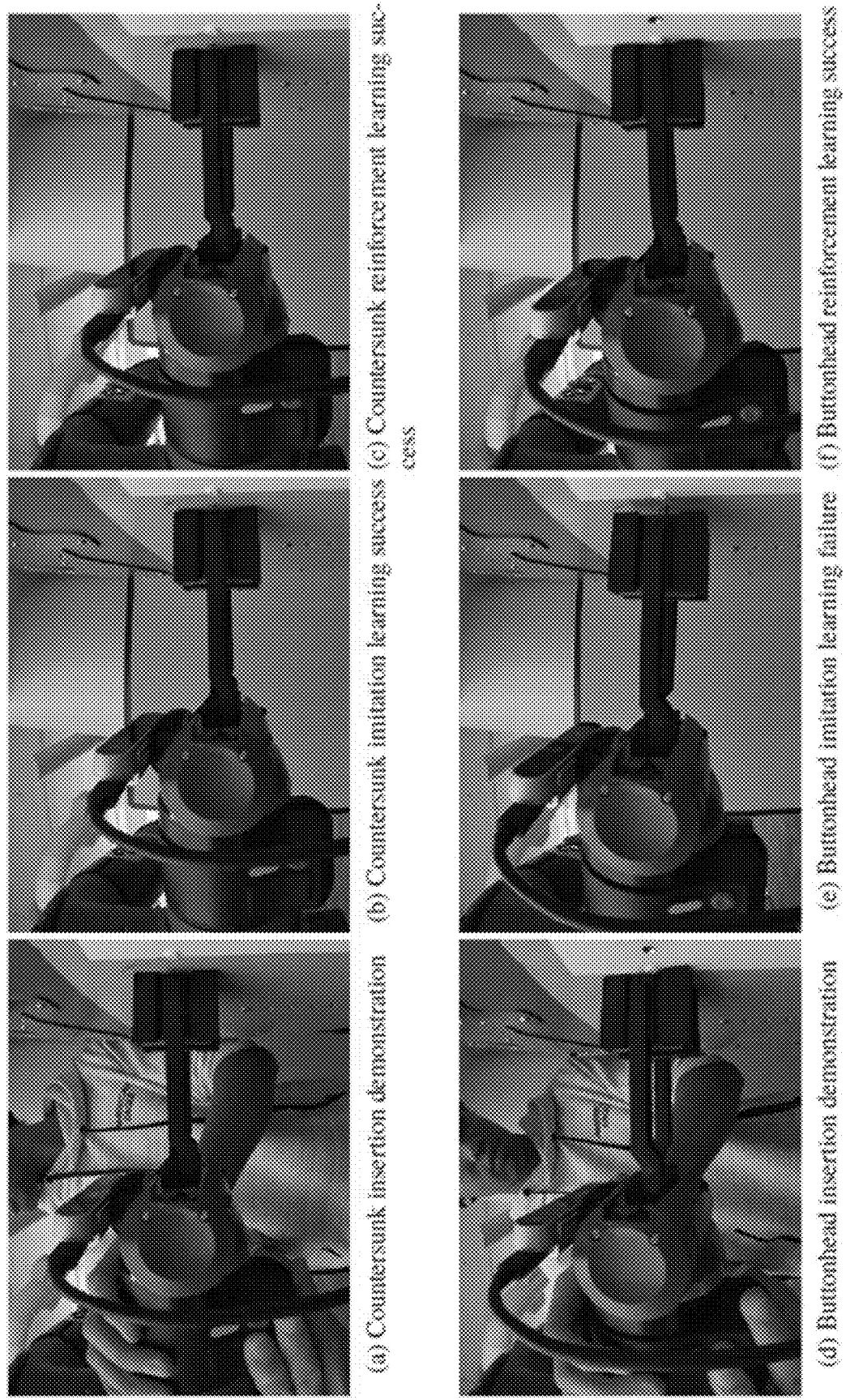
FIGS. 12 and 13 show the performance results of the human-assisted AI training system of FIG. 5.

FIG. 12 shows the results of insertion policy tests. The human-guided demonstration is shown in sub-panel (A) for countersunk holes. The system successfully inserted fastener with both imitation learning (shown in sub-panel (B)) and reinforcement learning (shown in sub-panel (C)).

The human-guided demonstration is shown in sub-panel (D) for buttonhead holes. The system failed to insert the fastener with imitation learning (shown in sub-panel (E)). The system then learned to correct its behavior and made a successful insertion after a few iterations (shown in sub-panel (F)).

Figure 13:
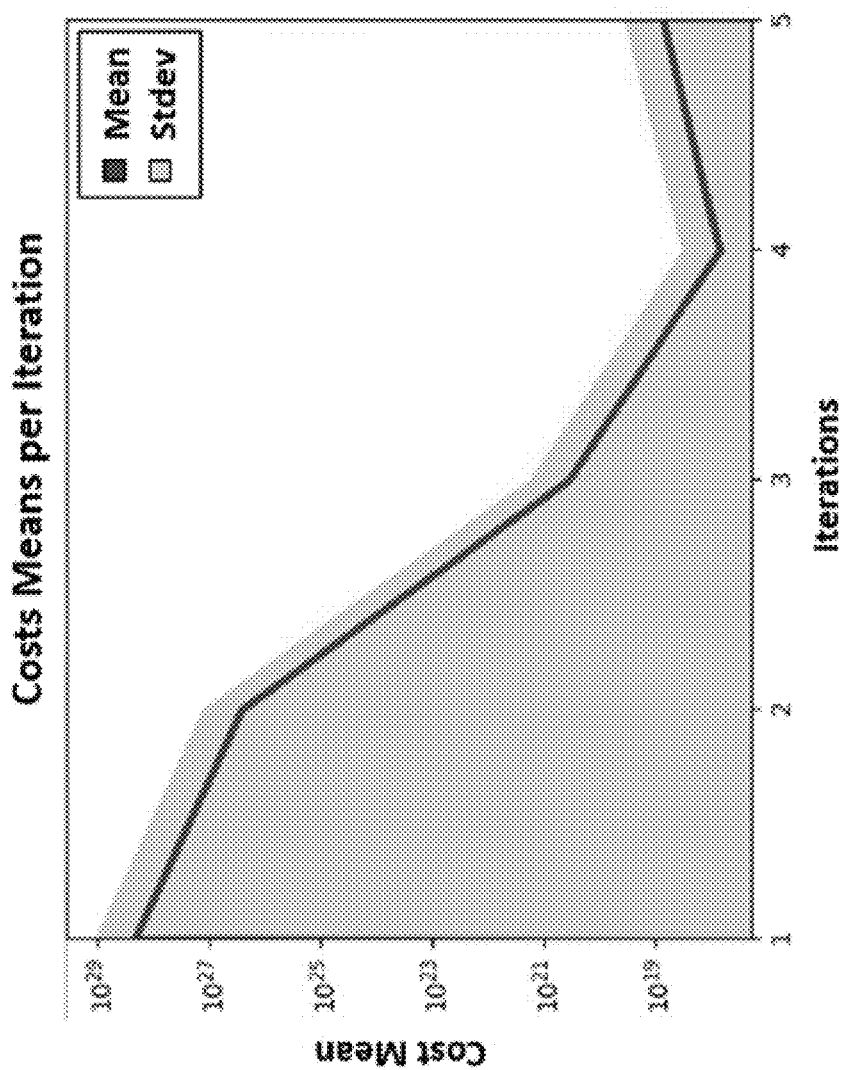

The study further explored the replicability of the insertion policy by learning on multiple holes around the coupon. In this evaluation, 16 holes were selected at random around the coupon. The system was trained to insert the rivet from a distance of less than 5 cm from the hole. The policy trained for 5 iterations on each hole to create a trained insertion trajectory by the final iteration. The study executed this trajectory a final time to verify the insertion had been learned. On all 16 holes, the system successfully executed the proper training trajectory. FIG. 13 shows the means and standard deviations of the resulting cost functions for all 16 learned trajectories per iteration. The cost function widely varied between trials, but each time ultimately converged towards 0. The study indicates that a mapping function may be employed to generalize hole insertion to other holes in the workspace Discussion Kinesthetic teaching. One aspect of the study involved the system receiving demonstrations by a human user via kinesthetic teaching to learn an insertion policy. The system analyzed desired behaviors demonstrated by a human who physically maneuvered the robot to execute a specific trajectory to be replicated by the system. The system recorded this trajectory. This method of learning from demonstration applied to the system has also been widely used in accomplishing assembly tasks. Zhu and Hu [2] surveyed existing LfD research and stated that industrial robots could not adapt to unexpected changes in the environment; hence the emphasis on the robustness of the system evaluated in the study. Zhu and Hu also discussed the advantages of kinesthetic teaching, including being able to be used directly on the robot, but in turn, potentially affecting the forces recorded during the demonstration. Tang et al. [3] acknowledged this same limitation by using motion capture instead to capture demonstrations. While kinesthetic teaching is not an infallible instruction method, as human forces recorded during the demonstration can adversely affect learning, other research has controlled for this error through the use of movement primitives.

The instant study leveraged Dynamic Movement Primitives (DMPs) [4], which are building blocks for encoding trajectories as dynamic systems that can be used to generate complex movements in real time. Similar to the study, Abu-Dakka et al. [5] used DMPs to recreate trajectories from demonstration and in addition, corrected those trajectories with interactive control learning. Another study by Maeda et al. [6] introduced Probabilistic Movement Primitives to recognize human actions and generate the most applicable movement primitive for a robot to follow. Similar to Abu-Dakka et al., the instant study developed and explored imitation learning to recreate a trajectory in the study environment, especially on an intolerant insertion. The system of the instant study learned an insertion policy through reinforcement learning, enabling the system to improve upon its initial programming automatically—without further human instruction.

In searching for holes with computer vision techniques, issues often arise with position uncertainty in lining up the robot manipulator with the target hole. Some studies intentionally incorporate system limitations to explore search strategies that lead to insertion under such conditions. Chhatpar and Branicky developed and tested cases resulting in approaches such as tilting the end-effector upon nearing the hole and spiraling towards the hole [7]. Similarly focused on rectifying vision equipment fallacies, Abu-Dakka et al. developed "exception strategies" to correct calibration errors between their camera and robot. These involved analyzing force feedback from contact with surfaces in their environment in positions known a priori to realign the camera's estimates.

The study took an approach differing from these approaches by performing smooth insertion using the human operator's demonstration. The study minimized unnecessary contact between the robot's end-effector and the environment, including when holding a fastener, to avoid damaging the fuselage. In a different approach, Xi et al. [8] considered computing rivet patterns in the aircraft to programmatically find unseen holes based on their expected position. This method is akin to developing their own CAD model from approximation. However, as explored by Zhu et al., CAD models may not accurately represent the real world when accounting for unmodeled factors such as the workpiece position and orientation and the gripper of the robot [9]. For the curvilinear workspace problem defined in the study, and because custom-made grippers were used, it was determined that modeling the environment purely through computational means would be insufficient. Human input was used to assist in this task.

Fastener insertion in manufacturing assembly is one form of the peg-in-hole problem. Peg-in-hole is a standard robot assembly learning task that involves using a robot to insert a peg (e.g., typically, but not limited to, a cylinder) into a corresponding hole with matching geometry (e.g., a circle for a cylinder or a square for a rectangular prism) [10]. In fact, Qiao and Tso. [10] worked to expand this problem by finding an "allowable range" of similarly shaped geometric objects that could be used in the standard peg-in-hole problem. In the present study, the system's performing the task of inserting rivets into their corresponding holes provided another representation of the peg-in-hole task. In [11], the researchers used an anthropomorphic robot with vision to insert differently shaped pegs into holes. They noted that the clearance of the hole was smaller than the tolerance of their robot, so they utilized peg tilting strategies similar to humans. Current approaches to this problem include Qiao et al. [12], who achieved high-precision peg insertion into chamferless holes with a force sensor on the wrist of the robot, and Chhatpar and Branicky [13], who focused on correcting the misalignment of parts from position uncertainty in an assembly via localization.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include one particular value and/or the other particular value.

By "comprising" or "containing" or "including," is meant that at least the name compound, element, particle, or method step is present in the composition or article or method but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications and publications as listed below and throughout this document are hereby incorporated by reference in their entirety herein.

[1] Austin Weber, "Assembly Automation Takes Off in Aerospace Industry," Assembly Magazine, 2015. URL https://www.assemblymag.com/articles/92790-assembly-automation-takes-off-in-aerospace-industry.

[2] Zhu, Z., and Hu, H., "Robot learning from demonstration in robotic assembly: A survey," Robotics, Vol. 7, No. 2, 2018. https://doi.org/10.3390/robotics7020017.

[3] Tang, T., Lin, H. C., Zhao, Y., Fan, Y., Chen, W., and Tomizuka, M., "Teach industrial robots peg-hole-insertion by human demonstration," IEEE/ASME International Conference on Advanced Intelligent Mechatronics, AIM, Vol. 2016-September, 2016, pp. 488-494. https://doi.org/10.1109/AIM.2016.7576815.

[4] Ijspeert, A. J., Nakanishi, J., Hoffmann, H., Pastor, P., and Schaal, S., "Dynamical Movement Primitives: Learning Attractor Models for Motor Behaviors," Neural Computation, Vol. 25, 2013, pp. 328-373. URL http://www.mitpressjournals.org/doi/abs/10.1162/NECO_a_00393.

[5] Abu-Dakka, F. J., Nemec, B., Kramberger, A., Buch, A. G., Kruger, N., and Ude, A., "Solving peg-in-hole tasks by human demonstration and exception strategies," Industrial Robot, Vol. 41, No. 6, 2014, pp. 575-584. https://doi.org/10.1108/IR-07-2014-0363.

[6] Maeda, G., Ewerton, M., Lioutikov, R., Ben Amor, H., Peters, J., and Neumann, G., "Learning interaction for collaborative tasks with probabilistic movement primitives," IEEE-RAS International Conference on Humanoid Robots, Vol. 2015-Febru, 2015, pp. 527-534. https://doi.org/10.1109/HUMANOIDS.2014.7041413.

[7] Chhatpar, S. R., and Branicky, M. S., "Search strategies for peg-in-hole assemblies with position uncertainty," IEEE International Conference on Intelligent Robots and Systems, Vol. 3, 2001, pp. 1465-1470. https://doi.org/10.1109/iros.2001.977187.

[8] Xi, F. F., Yu, L., and Tu, X. W., "Framework on robotic percussive riveting for aircraft assembly automation," Advances in Manufacturing, Vol. 1, No. 2, 2013, pp. 112-122. https://doi.org/10.1007/s40436-013-0014-5.

[9] Zhu, W., Mei, B., Yan, G., and Ke, Y., "Measurement error analysis and accuracy enhancement of 2D vision system for robotic drilling," Robotics and Computer-Integrated Manufacturing, Vol. 30, No. 2, 2014, pp. 160-171. https://doi.org/10.1016/j.rcim.2013.09.014, URL http://dx.doi.org/10.1016/j.rcim.2013.09.014.

[10] Qiao, H., and Tso, S. K., "Three-step precise robotic peg-hole insertion operation with symmetric regular polyhedral objects," International Journal of Production Research, Vol. 37, No. 15, 1999, pp. 3541-3563. https://doi.org/10.1080/002075499190176.

[11] Broenink, J. F., and Tiernego, M. L. J., "Peg-in-Hole assembly using Impedance Control with a 6 DOF Robot," Proceedings 8$^{th}$ European Simulation Symposium, No. January, 1996, pp. 504-508.

[12] Qiao, H., Dalay, B. S., and Parkin, R. M., "Robotic Peg-Hole Insertion Operations using a Six-Component Force Sensor," Proceedings of the Institution of Mechanical Engineers, Part C: Journal of Mechanical Engineering Science, Vol. 207, No. 5, 1993, pp. 289-306. https://doi.org/10.1243/PIME{_}PROC{_}1993{_}207{_}134{_}02.

[13] Chhatpar, S. R., and Branicky, M. S., "Localization for Robotic Assemblies with Position Uncertainty," IEEE International Conference on Intelligent Robots and Systems, Vol. 3, 2003, pp. 2534-2540. https://doi.org/10.1109/iros.2003.1249251.

[14] Toris, R., and Kent, D., "RAIL Segmentation,", 2014. URL https://github.com/GT-RAIL/rail_segmentation/tree/kinetic-devel.

[15] Lowe, D. G., "Distinctive image features from scale-invariant keypoints," International Journal of Computer Vision, 2004, pp. 91-110. URL https://www.cs.ubc.cal—lowe/papers/ijcv04. pdf.

[16] Bradski, G., "The OpenCV Library," Dr. Dobb's Journal of Software Tools, 2000.

[17] Koch, G., Zemel, R., and Salakhutdinov, R., "Siamese Neural Networks for One-shot Image Recognition," International Conference on Machine Learning, 2015. https://doi.org/10.1136/bmj. 2.5108.1355-c.

[18] Chernova, S., and L. Thomaz, A., "Robot learning from human teachers," Synthesis Lectures on Artificial Intelligence and Machine Learning, Vol. 28, 2014, pp. 1-121. https://doi.org/10.2200/500568ED 1 V01Y201402AIM028.

[19] Stulp, F., and Sigaud, O., "Path integral policy improvement with covariance matrix adaptation," Proceedings of the 29$^{th}$ International Conference on Machine Learning, ICML 2012, Vol. 1, 2012, pp. 281-288.

What is claimed is:

1. A method to manufacture or assemble a workpiece comprising landmarks or holes, the method comprising:
while a camera mounted on a robot arm is swept through a workspace, capturing, by a processor, a set of images of a first workpiece, wherein the first workpiece comprises one or more holes;
determining, by the processor using the captured set of images, a surface normal orientation for the first workpiece, wherein the surface normal orientation is determined by:
determining, by the processor, a point cloud data object of the captured set of images;
determining, by the processor, a plane intersecting a pre-defined portion of the point cloud data object; and
determining, by the processor, a normal vector or direction from the plane as the surface normal orientation;
directing, by the processor, the robot arm or a mechanized actuator of the camera, to orient the camera to an orientation to capture at least one image of the first workpiece at the surface normal orientation;
generating, by the processor, a composite image or a data model of the first workpiece by aggregating at least a portion of the set of images of the first workpiece, wherein the composite image or the data model includes an image of, or data object representing, the first workpiece having a workpiece region captured at a plurality of surface normal orientations; and
determining, by the processor, using the composite image or a portion thereof, coordinates of landmark locations of the one or more holes of the first workpiece and/or characteristics of the one or more holes;
wherein the determined coordinates of landmark locations and/or characteristics of the one or more landmarks used by a robotic system to perform manufacturing action on, or to, a second workpiece to make it resemble the first workpiece.

2. The method of claim 1, wherein the determining of the characteristics of the one or more landmarks includes:
determining, via a classification operation, a classification value for at least one of the one or more landmarks.

3. The method of claim 2, wherein the classification operation is performed using a trained AI model or operation.

4. The method of claim 3, wherein the trained AI model or operation includes a trained neural network.

5. The method of claim 1, wherein generating the composite image or the data model of the first workpiece, including a first image and a second image, comprises:
determining candidate features in the first image and the second image, wherein the first image and the second image each has a workpiece region captured at a given surface normal orientation;
aligning the candidate features of the first image and the second image; and
generating, via a stitching operation, the composite image or the data model using the first image and the second image, or portions thereof.

6. The method of claim 1, further comprising:
determining, by the processor, a first dynamic motion primitive data object;
updating, by the processor, via an AI-learning operation, the first dynamic motion primitive data object using the coordinates of landmark locations of the one or more landmarks of the first workpiece as a target parameter in a reinforcement learning operation, wherein the first dynamic motion primitive data object, or instructions derived therefrom, is stored and subsequently used to direct a robotic system in the manufacturing of the second workpiece.

7. The method of claim 6, wherein the reinforcement learning operation employs a reward function that minimizes, from multiple guided learning examples, at least one of (i) difference or residual of measured or determined force in a direction of action to a pre-defined value (static or dynamic), (ii) difference or residual of measured or determined position to a pre-defined trajectory of movement, (iii) difference or residual of the measured or determined position of a target of action, and (iv) a combination thereof.

8. The method of claim 7, further comprising:
determining, by the processor, a second dynamic motion primitive data object;
updating, by the processor, via then AI-learning operation, the second dynamic motion primitive data object using the coordinates of landmark locations of the one or more landmarks of the first workpiece, wherein the second dynamic motion primitive data object, or an instruction derived therefrom, is stored and subsequently used in combination with the first dynamic motion primitive to direct the robotic system in the manufacturing of the second workpiece.

9. The method of claim 6, wherein the first dynamic motion primitive data object, or the instructions derived therefrom, includes at least one of:
first kinetic instructions to move from a first position to a second position to insert an attachment at a landmark defined as a target location;
second kinetic instructions to move an effector component from a third position to a fourth position to drill a landmark at a target location;
third kinetic instructions to move the effector component from a first position to a second position to spray or dispense a propellant over a set of target location of regions;
fourth kinetic instructions to move the effector component from a first position to a second position to cut a set of target location of regions; and
fifth kinetic instructions to move the effector component from a first position to a second position to rotate a wrap over a set of target location of regions.

10. The method of claim 6, wherein the first dynamic motion primitive data object, or the instructions derived therefrom, includes, at least:
a first movement primitive data object, the first movement primitive data object being associated with movement of the robot arm from a first position to a second position, wherein the second position is associated with a task movement; and
a second movement primitive data object associated with the task movement.

11. The method of claim 10, wherein the second movement primitive data object includes instructions to at least one of an insertion task, a drilling task, a holding task, a spraying or coating task, and a wrapping task.

12. The method of claim 1, further comprising:
defining, by the processor, a salient region of the workspace based on two or more coordinate received from measurements of the robotic arm established by a user.

13. The method of claim 1, further comprising:
defining, by the processor, a salient region of the workspace based on two or more coordinates received from a user via a computer user interface.

14. The method of claim 12, wherein the salient region, includes a first coordinate position and a second coordinate position, the first and second coordinate positions being interpolated to define a grid of waypoints parallel to a determined surface of the workpiece.

15. The method of claim 1, further comprising:
determining instructions to perform the manufacturing action on, or to, the second workpiece to make it resemble the first workpiece based on motive primitives generated from the determined coordinates of the landmark locations and/or the characteristics of the one or more landmarks.

16. A system comprising:
a processor;
a memory having instructions stored thereon, wherein execution of the instructions by the processor causes the processor to:
receive (i) image data from a camera mounted on a robot arm and (ii) coordinate data of a landmark on the robot arm;
while the camera mounted on the robot arm is swept through a workspace, capture a set of images of a first workpiece and corresponding set of coordinate data of the landmark, wherein the first workpiece comprises one or more landmarks;
determine, from the captured set of images, a surface normal orientation for the first workpiece, wherein the surface normal orientation is determined by:
determining, by the processor, a point cloud data object of the captured set of images:
determining, by the processor, a plane intersecting a pre-defined portion of the point cloud data object; and
determining, by the processor, a normal vector or direction from the plane as the surface normal orientation;
direct the robot arm or a mechanized actuator of the camera, to orient the camera to an orientation to capture at least one image of the first workpiece at the surface normal orientation;
generate a composite image or a data model of the first workpiece by aggregating at least a portion of the set of images of the first workpiece, wherein the composite image or the data model includes an image of, or data object representing, the first workpiece having a workpiece region captured at a plurality of surface normal orientations; and
determine using the composite image or a portion thereof and the corresponding set of coordinate data, coordinates of landmark locations of the one or more landmarks of the first workpiece and/or characteristics of the one or more landmarks;
wherein the determined coordinates of landmark locations and/or characteristics of the one or more landmarks are used by a robotic system to perform manufacturing action on, or to, a second workpiece to make it resemble the first workpiece.

17. The system of claim 16, further comprising:
the robot arm;
the camera mounted to said robot arm; and
a robot controller, the robot controller being operatively connected to the processor and configured to receive the image data and the coordinate data.

18. The system of claim 17, wherein robot controller is configured to receive instructions to perform a manufacturing task based on a set of movement primitives derived from the determined coordinates of landmark locations and/or the characteristics of the one or more landmarks.

19. A non-transitory compute readable medium having instructions stored thereon, wherein execution of the instructions by a processor, causes the processor to:

receive (i) image data from a camera mounted on a robot arm and (ii) coordinate data of a landmark on the robot arm;

while the camera mounted on the robot arm is swept through a workspace, capture a set of images of a first workpiece and corresponding set of coordinate data of the landmark, wherein the first workpiece comprises one or more landmarks;

determine, using the captured set of images, a surface normal orientation for the first workpiece, wherein the surface normal orientation is determined by:

determining, by the processor, a point cloud data object of the captured set of images;

determining, by the processor, a plane intersecting a pre-defined portion of the point cloud data object; and determining, by the processor, a normal vector or direction from the plane as the surface normal orientation;

direct the robot arm or a mechanized actuator of the camera, to orient the camera to an orientation to capture at least one image of the first workpiece at the surface normal orientation;

generate a composite image or a data model of the first workpiece by aggregating at least a portion of the set of images of the first workpiece, wherein the composite image or the data model includes an image of, or data object representing, the first workpiece having a workpiece region captured at a plurality of surface normal orientations; and determine using the composite image or a portion thereof and the corresponding set of coordinate data, coordinates of landmark locations of the one or more landmarks of the first workpiece and/or characteristics of the one or more landmarks;

wherein the determined coordinates of landmark locations and/or characteristics of the one or more landmarks are used by a robotic system to perform manufacturing action on, or to, a second workpiece to make it resemble the first workpiece.

* * * * *